(12) United States Patent
Rohlf et al.

(10) Patent No.: US 9,218,362 B2
(45) Date of Patent: Dec. 22, 2015

(54) MARKUP LANGUAGE FOR INTERACTIVE GEOGRAPHIC INFORMATION SYSTEM

(71) Applicant: Google Inc., Mountain View, CA (US)

(72) Inventors: John Rohlf, Mountain View, CA (US); Bent Hagemark, San Francisco, CA (US); Brian A. McClendon, Portola Valley, CA (US); Michael Timothy Jones, Los Altos Hills, CA (US)

(73) Assignee: GOOGLE INC., Mountain View, CA (US)

( * ) Notice: Subject to any disclaimer, the term of this patent is extended or adjusted under 35 U.S.C. 154(b) by 212 days.

(21) Appl. No.: 14/033,296

(22) Filed: Sep. 20, 2013

(65) Prior Publication Data

US 2014/0212029 A1    Jul. 31, 2014

Related U.S. Application Data

(63) Continuation of application No. 12/651,842, filed on Jan. 4, 2010, now Pat. No. 8,565,514, which is a continuation of application No. 11/762,049, filed on Jun. 12, 2007, now Pat. No. 7,643,673.

(60) Provisional application No. 60/813,059, filed on Jun. 12, 2006.

(51) Int. Cl.
*G06K 9/00* (2006.01)
*G06F 17/30* (2006.01)

(52) U.S. Cl.
CPC ...... *G06F 17/30241* (2013.01); *G06F 17/3087* (2013.01)

(58) Field of Classification Search
None
See application file for complete search history.

(56) References Cited

U.S. PATENT DOCUMENTS

| | | | |
|---|---|---|---|
| 5,791,346 A | 8/1998 | Craine et al. | |
| 5,825,908 A | 10/1998 | Pieper et al. | |
| 6,195,088 B1 | 2/2001 | Signes | |
| 6,426,757 B1 | 7/2002 | Smith et al. | |
| 6,901,428 B1 | 5/2005 | Frazier et al. | |
| 7,225,207 B1 | 5/2007 | Ohazama et al. | |
| 7,353,114 B1* | 4/2008 | Rohlf | G06F 17/2247 702/5 |
| 7,362,323 B2* | 4/2008 | Doyle | G06F 17/30876 345/419 |
| 8,072,448 B2* | 12/2011 | Zhu | G06F 17/30241 340/995.1 |
| 8,369,607 B2 | 2/2013 | Mashitani et al. | |

(Continued)

OTHER PUBLICATIONS

"The Virtual Reality Modeling Language," VRML 97, 1997 [online] [Retrieved on Oct. 8, 2008] Retrieved from the internet <URL: http://www.web3d.org/x3d/specifications/vrml/ISO-IEC-14772-VRML97/#International%20Standard%20ISO/IEC%2014772-1:1997>.

(Continued)

*Primary Examiner* — Wesley Tucker
(74) *Attorney, Agent, or Firm* — Fenwick & West LLP

(57) ABSTRACT

Data-driven guarded evaluation of conditional-data associated with data objects is used to control activation and processing of the data objects in an interactive geographic information system. Methods of evaluating conditional-data to control activation of the data objects are disclosed herein. Data structures to specify conditional data are also disclosed herein.

5 Claims, 9 Drawing Sheets

(56) References Cited

U.S. PATENT DOCUMENTS

| | | | | |
|---|---|---|---|---|
| 2002/0103597 | A1* | 8/2002 | Takayama | G01C 21/34 701/431 |
| 2002/0103781 | A1* | 8/2002 | Mori | G06F 17/3087 1/1 |
| 2002/0112237 | A1* | 8/2002 | Kelts | G06F 3/0481 725/39 |
| 2002/0123841 | A1* | 9/2002 | Satoh | G01C 21/3638 701/532 |
| 2003/0069693 | A1 | 4/2003 | Snapp et al. | |
| 2003/0074391 | A1 | 4/2003 | Carter et al. | |
| 2006/0005114 | A1* | 1/2006 | Williamson | G06F 17/2247 715/211 |

OTHER PUBLICATIONS

"KML 2.1 Tutorial," Google, 2007, [online] [Retrieved on Dec. 13, 2007], Retrieved from the Internet <URL: http://code.google.com/apis/kml/documentation/kml_21tutorial.html>.

Ribeiro, J., et al., "A Syntactic and Lexicon Analyzer for the Geography Markup Language (GML)," IEEE 2004, pp. 2896-2899.

"Geography Markup Language," Wikipedia, [online] [Retrieved on Oct. 23, 2007, last modified on Aug. 14, 2007] Retrieved from the internet <URL: http://en.wikipedia.org/wiki/Geography_Markup_Language>.

"Geo-Web, Mark up and the Geo Web, GML and KML Syntax," geoweb.blog.com, [online] [Retrieved on Oct. 23, 2007, last modified on Jul. 13, 2006], Retrieved from the internet URL:http://geoweb.blog.com/313918/>.

"Introduction to ArcXML," ESRI Developer Network, 2005, 7 pages, [online] [retrieved on Aug. 9, 2006] Retrieved from the Internet: <URL: http://ednddoc.esri.com/arcims/9.0/elements/coverpage.htm>.

"Styled Layer Descriptor, OpenGIS® Styled Layer Descriptor (SLD) Implementation Specification," Open Geospatial Consortium, Inc., 2006, 2 pages, [online] [retrieved on Aug. 9, 2006] Retrieved from the Internet: <URL: http://www.opengeospatial.org/standards/sld>.

"Styled Layer Descriptor Implementation Specification," Open GIS Consortium Inc., Sep. 19, 2002, pp. i-ix, 1-107, Reference No. OGC 02-070, Version 1.0.0, William Lalonde, ed.

"Styled Layer Descriptor Application Profile of the Web Map Service: Draft Implementation Specification," Open Geospatial Consortium, Inc., Oct. 19, 2005, pp. i-ix, 1-44, Reference No. OGC 05-078, Version 1.1.0, Dr. Markus Müller, James MacGill, eds.

PCT International Search Report and Written Opinion, PCT/US2007/0171051, Sep. 19, 2008.

Azuma, R., "A Survey of Augmented Reality," in Presence: Teleoperators and Virtual Environments, Aug. 1997, pp. 355-385, vol. 6, No. 4.

Chen, S., et al., "View Interpolation for Image Synthesis," Proceedings of the 20$^{th}$ Annual Conference on Computer Graphics and Interactive Techniques, 1993, 7 Pages.

Chiang, C., et al., "PanoVR SDK—A Software Development Kit for Integrating Photo-Realistic Panoramic Images and 3-D Graphical Objects into Virtual Worlds," Proceedings of the ACM Symposium on Virtual Reality Software and Technology, 1997, pp. 147-154.

Pierce, J., et al., "Image Plane Interaction Techniques in 3D Immersive Environments," Symposium on Interactive 3D Graphics, 1997, pp. 39-43.

Shimamura, J., et al., "Construction of an Immersive Mixed Environment Using an Omnidirectional Stereo Image Sensor," IEEE, 2000, 8 Pages.

Office Action for U.S. Appl. No. 11/762,049, Oct. 31, 2008, 9 Pages.
Office Action for U.S. Appl. No. 11/762,049, Apr. 29, 2009, 12 Pages.

* cited by examiner

MARKUP LANGUAGE FOR INTERACTIVE GEOGRAPHIC INFORMATION SYSTEM

CROSS REFERENCE TO RELATED APPLICATION

This application is a continuation of U.S. application Ser. No. 11/762,049 filed on Jun. 12, 2007, which claims the benefit under 35 U.S.C 119(e) of U.S. Provisional Application No. 60/813,059 filed on Jun. 12, 2006 which is incorporated by reference herein.

FIELD OF THE INVENTION

The invention relates to mapping systems, and more particularly, to geographic information systems and distributed geographic information systems.

BACKGROUND

A geographic information system (GIS) is a system for archiving, retrieving, and manipulating data that has been stored and indexed according to the geographic coordinates of its elements. A geographic information system generally can utilize a variety of data types, such as imagery, maps, and tables. Typical geographic information systems support the display of information such as lines to indicate roadway paths, images of a planetary surface to show natural features, text to indicate city and country names, and terrain elevation data to represent mountains and valleys. Often such systems allow "layers" of such data to be defined and displayed, and in some cases a set of such information is provided with the system as data files or is made available as a network-accessible resource, as in the case of a distributed geographic information system (DGIS). (For purposes of simplicity, the term "GIS" will be used herein to refer to both GISs and DGISs collectively). Even in data-rich environments it may be necessary for users and developers to create, store, and share annotations in the form of additional information to be displayed within or above standard data layers. An example of an annotation element would be a marker indicating the location of a fire hydrant.

Generally, conventional geographic information systems have limited abilities to interactively display large numbers of annotation elements. For example, a GIS that could readily display one, ten, or one hundred fire hydrant markers may experience performance degradation in loading, processing, or displaying annotation data for one million markers. This performance decline may be manifested as a noticeable or intolerable pause when loading a large dataset, excessive use of memory and processing resources to operate on a large data set, or slowness of visual updates during rotation, zooming, and otherwise displaying a large dataset. In some cases, a typical GIS might fail to operate when certain internal algorithmic or implementation limits are exceeded by the size of a very large set of annotations or when the number of annotations creates an algorithmic processing burden that is infeasible for realizable computation. In this sense, existing GIS are effectively limited in their ability to manage very large sets of annotation data while maintaining interactive performance levels in all aspects of operation.

When conventional geographic information systems have attempted to manage the complexity of very large datasets it has been through mechanisms controlled by the logic and internal configuration of the GIS itself. For example, a GIS may detect that a dataset to be loaded is too large for direct operation at interactive rates and therefore load only a limited number (N) of data elements such as the first N, the last N, a random selection of N elements from the data, or, perhaps, ask the user if the default limit (N) should be raised at the expense of performance and potentially, improper program operation. For example, a coastline may be well represented by a simple specification when viewed at great distance yet might require more detail when viewed more closely. Further, the totality of the coastline at the greater level of detail may well contain too much data for the GIS system to load and process at interactive rates, even if any unseen data are discarded through the well-known techniques of view-frustum culling.

SUMMARY OF THE INVENTION

A geographical information system, along with associated methods enables the use of conditional-data in association with data objects to control activation of the data objects in a visual environment, whereby the data objects are loaded and processed in the visual environment. The method includes receiving a request for content of the visual environment to be displayed in a first two dimensional display area of a display device. This method identifies an object in the visual environment and a three dimensional volume associated with the object. The method further generates a second two dimensional area based on the three dimensional volume. The method further activates the data object responsive to a determination that the second two dimensional area is viewable within the first two dimensional area.

Another aspect of the invention is a computer program product encoded on a computer-readable storage medium encoded with a computer-readable data structure for describing an object and a three dimensional volume defining an activation condition of the object, wherein the data structure is readable by a computer processor to display the object. The data structure comprises at least one object markup language element, the object markup language element defining an object to be activated. The data structure also comprises a plurality of object tags associated with the object markup language element wherein the plurality of object tags describe the object defined by the object element. The data structure further comprises a plurality of coordinate markup language elements, each coordinate markup language element defining a three dimensional coordinate in a three dimensional space. The data structure further comprises a plurality of region tags, comprising a tag for each coordinate markup language element, wherein the region tags describe a three dimensional volume defining the activation condition of the object. The data structure further comprises a minimum pixel markup language element defining a minimum number of pixels. The data structure also comprises a maximum pixel markup language element defining a maximum number of pixels; and a plurality of tags, comprising tags for the maximum and minimum pixel markup language elements, wherein the tags describe a visibility range under which the object is to be displayed.

BRIEF DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
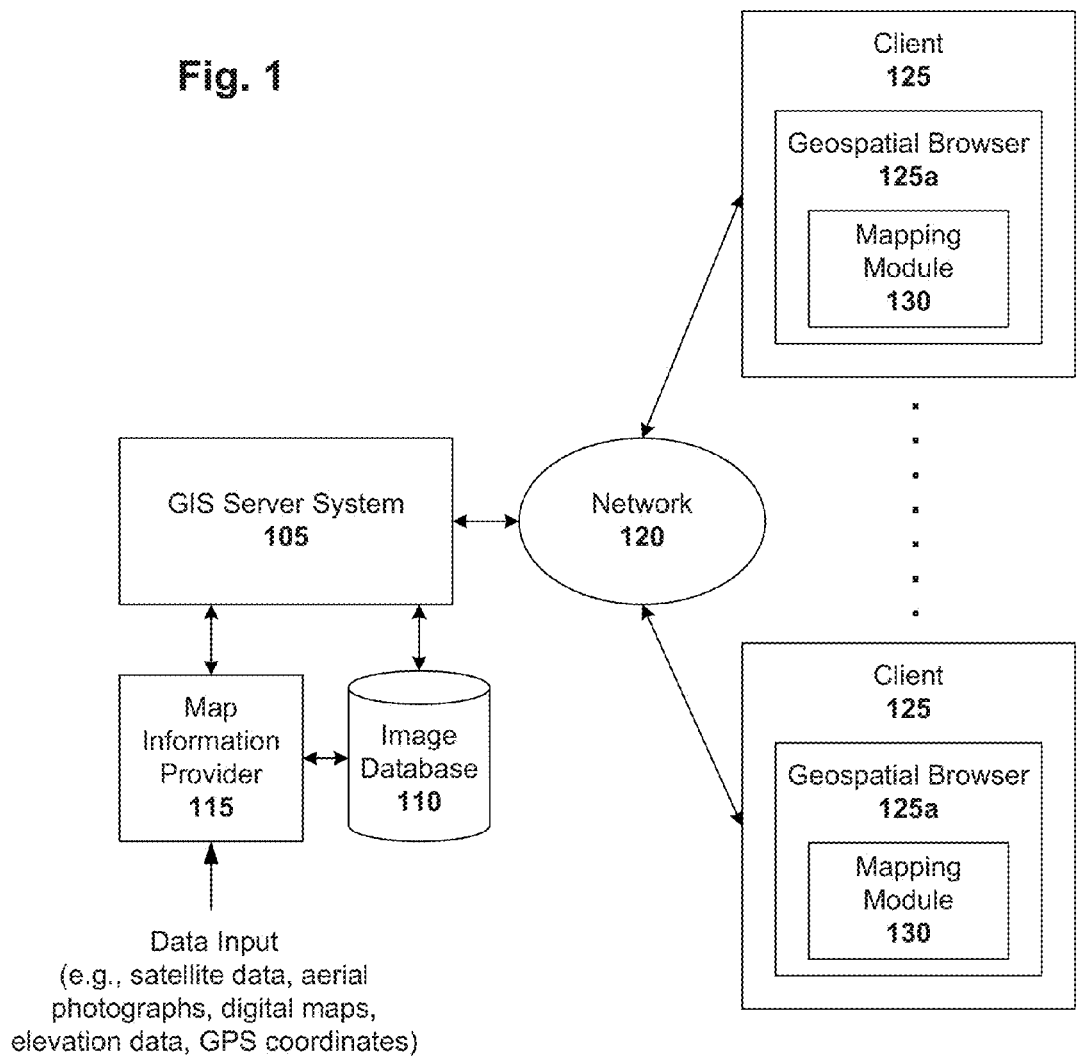
FIG. 1 illustrates an interactive GIS configured in accordance with an embodiment of the present invention.

Geographic information systems (GIS) and techniques are disclosed that provide users with a greater degree of flexibility, utility, and information. The system may be a distributed geographic information system (DGIS) including multiple components that communicate with one another. For purposes of this disclosure, assume that "GIS" includes both GIS and DGIS configurations.

General Overview

A GIS configured to carryout the techniques described herein can be implemented, for example, in a client-server architecture, though other configurations will be apparent in light of this disclosure. In this type of embodiment, client-side software operates (in conjunction with server-side software) to cause images of a planet and other geospatial information to a user's computer (or generally, client device) so they can be seen by the user or otherwise processed. In one example case, the client software is implemented using various software objects that are grouped in modules according to different functions that run independently from one another in the system. These software modules can be part of a standalone GIS client application, or operable as plugins of an Internet browser application. The client device can be of any type of design, and generally has one or more processors (including both general purposes CPUs, as well as special purposes graphics processors), a memory, a network interface, a display device having a display area, and input devices for receiving user inputs.

In more detail, and in accordance with one particular embodiment, the client software includes a user interface module, in which a motion model in the user's client input to adjust the client's virtual viewing position and orientation relative to the visual environment of the GIS system. The motion model also determines a view specification which defines the client's viewable volume within a three-dimensional space (this viewable volume is known as a frustum and herein referred to as the user's visual environment), and the position and orientation of the frustum, herein referred to as the virtual camera viewpoint, with respect to a three-dimensional map. Once a visual specification is determined, it is placed in the memory.

The view specification is read from the memory by a renderer, which is a software object that draws or "renders" drawable data. The renderer is grouped in a separate renderer module and repeats a processing cycle, which includes: (1) reading the view specification in memory, (2) traversing a data structure in memory, referred to as a quad node tree, in which each quad node of the tree contains drawable data, and (3) drawing the drawable data contained in quad nodes of the quad node tree. Each quad node may have a payload of data and up to some number of references to other files (e.g., four), each of which may be other quad nodes.

The references in the quad nodes comprise a filename and a corresponding address in local memory (assuming the file exists in local memory). The files referenced by a quad node are referred to herein as the children of that quad node, and the referencing quad node is referred to as the parent. Quad node payloads may include various types of data and are limited to a maximum value. The amount of data needed to describe an area of a particular resolution may in some cases exceed this maximum value, such that the data must be split among parent and child quad nodes. Thus, data in a payload of a child quad node may be the same resolution as that of a parent quad node, but need not be as will be apparent in light of this disclosure.

When the renderer traverses the quad node tree, it first reads the payload of data in a parent quad node. If the payload is drawable data, the renderer will compare a bounding box (a volume that contains the data) of the payload, if present, to the view specification. If the bounding box is completely disjoint from the view specification, the data will not be drawn, despite the fact that the quad node has already been downloaded from a remote server.

If the payload is considered appropriate to draw, the renderer will attempt to access each of the up to four references of the quad node. If the reference contains an address to a file in local memory, the renderer will go to that child quad node and read the payload, repeating the process for each subsequent child quad node until it encounters a quad node with a payload that has a bounding box completely disjoint from the view specification. If the reference does not contain an address in the local memory (i.e., the referenced file does not exist in the local memory), the renderer cannot access the file, and will continue to move down the quad node tree without trying to obtain the file. In this embodiment, the renderer only reads from the quad node tree, and does not provide coordinate and resolution information to any other object.

The quad node itself has a built-in accessor function. When the renderer attempts to access a reference that has a filename, but no corresponding local address, this triggers the accessor function of the quad node to independently place its own address and the child reference number onto a cache node retrieval list, which comprises a list of information identifying files to be downloaded from remotes servers. A network loader in an independent network loader thread reviews the cache node retrieval list and requests only the files referenced on the list.

A cache node manager in an independent cache node manager thread allocates space in local memory and organizes files retrieved by the network loader into new quad nodes. The cache node manager also updates the parent quad nodes with the local memory address of these new child quad nodes. Therefore, on subsequent cycles of the renderer module, there will be additional quad nodes in local memory for the renderer to access. As in previous cycles, the renderer will look at the payload and draw all drawable data that does not fall completely outside the view specification. The renderer thread will continue this cycle until it reaches a quad node with a payload that has a bounding box completely disjoint from the view specification, or is otherwise inappropriate to draw. Thus, the renderer only draws what is already downloaded, and it only stops drawing when it encounters already downloaded data that has a bounding box completely disjoint from the view specification.

In addition to this architecture and functionality, a markup language is provided that facilitates communication between servers and clients of the interactive GIS. In one such embodiment, each server and client is programmed or otherwise configured to execute the markup language to carryout a number of GIS presentation operations, such as network links, ground overlays, screen overlays, placemarks, 3D models, and stylized GIS elements, such as geometry, icons, description balloons, polygons (the surface of extruded lines are considered polygons), and labels in the viewer by which the user sees the target area.

A number of techniques and features can be employed by various embodiments of the system. For instance, techniques for providing virtual tours of user-defined paths (e.g., driving directions) in the context of distributed geospatial visualization are provided. These techniques enable, for example, "fly through" of 3D satellite image map that is annotated with driving directions. Also, techniques for streaming and interactive visualization of filled polygon data are provided. These techniques enable, for instance, buildings and other map features to be provided in 3D, with size parameters (e.g., building height) used as metric in determining when to show the 3D features at the various zoom levels.

Also, a network link mechanism is provided to fetch remote content for a GIS application. A time-based network link fetches placemark files when triggered to do so by the passage of time (e.g., "Get file X every 20 seconds"). This feature allows an external server (e.g., traffic server or earthquake data server or airplane location data) to be designated and periodically queried for data. That data can then be populated onto a map. A view-dependent network link makes a search query when triggered by the motion of the view specification. This technique essentially makes a data layer out of the query. For instance, in response to user entering "schools," turn-on all schools within mapping system (e.g., both in the viewing window and outside viewing window to some degree) so as user scrolls, pans, or otherwise moves the map, the corresponding new schools come into view (while other schools go out of view).

Also, techniques for enabling ambiguous search requests in a GIS are provided. Such techniques enable geospatial context for an arbitrary query. For instance, in response to user entering a flight number, the system would show the location of the corresponding plane on a map. Likewise, in response to user entering a UPS tracking #, the system would show the location of the corresponding package on the map. The system can "fly" to the location of the searched item. Relational searching is also enabled. For instance, in response to user entering "diet," show location of hospitals, exercise clubs, Jamba Juice, Whole foods, etc. An auto zoom features shows location of all relevant hits.

Each of these techniques/features, as well as others, will be discussed in turn in greater detail, and can be implemented in an interactive GIS as will be apparent in light of this disclosure.

System Architecture

FIG. 1 illustrates an interactive GIS configured in accordance with an embodiment of the present invention.

The system combines satellite imagery, photographs, maps and other geographic data, and Internet search capability so as to enable a user to view imagery of the planet and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as his neighborhood or other area of interest. Results are displayed in a 3D view. The user can tilt and rotate the view to see 3D terrain and buildings. The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users.

As can be seen, the system includes a client-server architecture, where the server-side communicates with one or more clients 125 via a network 120. The server-side includes a GIS server system 105, an image database 110, and a map information provider 115. On the client-side, each client 125 includes a mapping module 130 that operates as a geospatial browser 125a (or other suitable viewer), so as to provide the user with an interface to the system. In one embodiment, at least some of the mapping modules 130 of the clients 125 further include development modules that end-users can use to generate data files describing particular presentations of GIS data, as is explained in further detail in the incorporated U.S. application Ser. No. 11/426,831, filed Jun. 27, 2006, titled "Markup Language for an Interactive Geographic Information System" which issued as U.S. Pat. No. 7,353,114 on Apr. 1, 2008. In addition, the system may further include one or more third-party content servers 140 for providing content to network links referring to the geospatial description file 140a encoded thereon. The geospatial description file 140a can be, for example, a KML file or other suitable script, as will be explained with reference to the network link.

The GIS server system 105 is in communication with the image database, which includes image data (e.g., digital maps, satellite images, aerial photographs, street-level photographs). Non-image data such as tabular data (e.g., digital yellow and white pages), and map layer data (e.g., database of diners, restaurants, museums, and/or schools; databases of seismic activity; database of national monuments; etc) can also be stored in database 110 or in some other storage facility accessible to server system 105. The database 110 (and others, if applicable) is populated (e.g., offline or in real-time) by the GIS server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition to, various third party map data services can be used to provide map information to server system 105. All such map internal/external information sources are generally represented by map information provider 115. In any case, the GIS server system 105 receives requests for map information, and responds to those requests, via the network 120. The map information provider 115 can also be further configured to respond directly to user requests for geographic data. In one embodiment, the GIS server system 105 encodes the map information in one or more data files and provides the files to the requestor.

Note that other modules may be included in the system, and that illustrated modules may be rearranged. For instance, the database 110 can be integrated into the GIS server system 105. Also, the map information provider 115 can be integrated into the GIS server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a desktop or laptop computer. Alternatively, a client 125 can be a wireless device, such as a personal digital assistant (PDA), smart phone, a navigation system located in a vehicle, a handheld GPS system, or other such devices/systems. In short, the client 125 can be any computer, device, or system that can execute the mapping module 130, and allows the user to interact with the GIS server system 105 (e.g., requesting maps, driving directions, and/or data searches, and then receiving data files in response). In the embodiment shown, the mapping module 130 executes or otherwise runs as geospatial browser 125a.

The GIS server system 105 can be implemented with conventional or custom technology. Numerous known server architectures and functionalities can be used to implement a GIS server. Further note that the GIS server system 105 may include one or more servers operating under a load balancing scheme, with each server (or a combination of servers) configured to respond to and interact with clients via the network 120. In one particular embodiment, the GIS server system 105 is implemented as discussed in the previously incorporated U.S. application Ser. No. 10/270,272, titled "Server for Geospatially Organized Flat File Data."

In general, when the user enters a search query (e.g., via the geospatial browser 125a presented by the client-side mapping module 130), it is put into a request and sent to the GIS server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 125a).

In addition to any conventional functionality, the GIS server system 105 is further configured to interact with the mapping module 130, as will be apparent in light of this disclosure. The mapping module 130 is discussed with further reference to FIG. 2a. In one embodiment, the server system 105 responds to the requesting client 125 by encoding data responsive to the request into one or more data files and providing the files to the client.

The network 120 may be any type of communications network, such as a local area network (e.g., intranet), wide area network (e.g., Internet), or some combination thereof. Alternatively, the network 120 may be a direct connection between a client 125 and the GIS server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the GIS server system 105, the geospatial browser 125a interface provided by the mapping module 130 provide a mapping system that serves maps and GIS data over the network 120. The system allows users to visualize, select, annotate, and explore geographic information all over the world or in a particular region, city, town, or other locale.

Client-Side Mapping Module

Figure 2A:
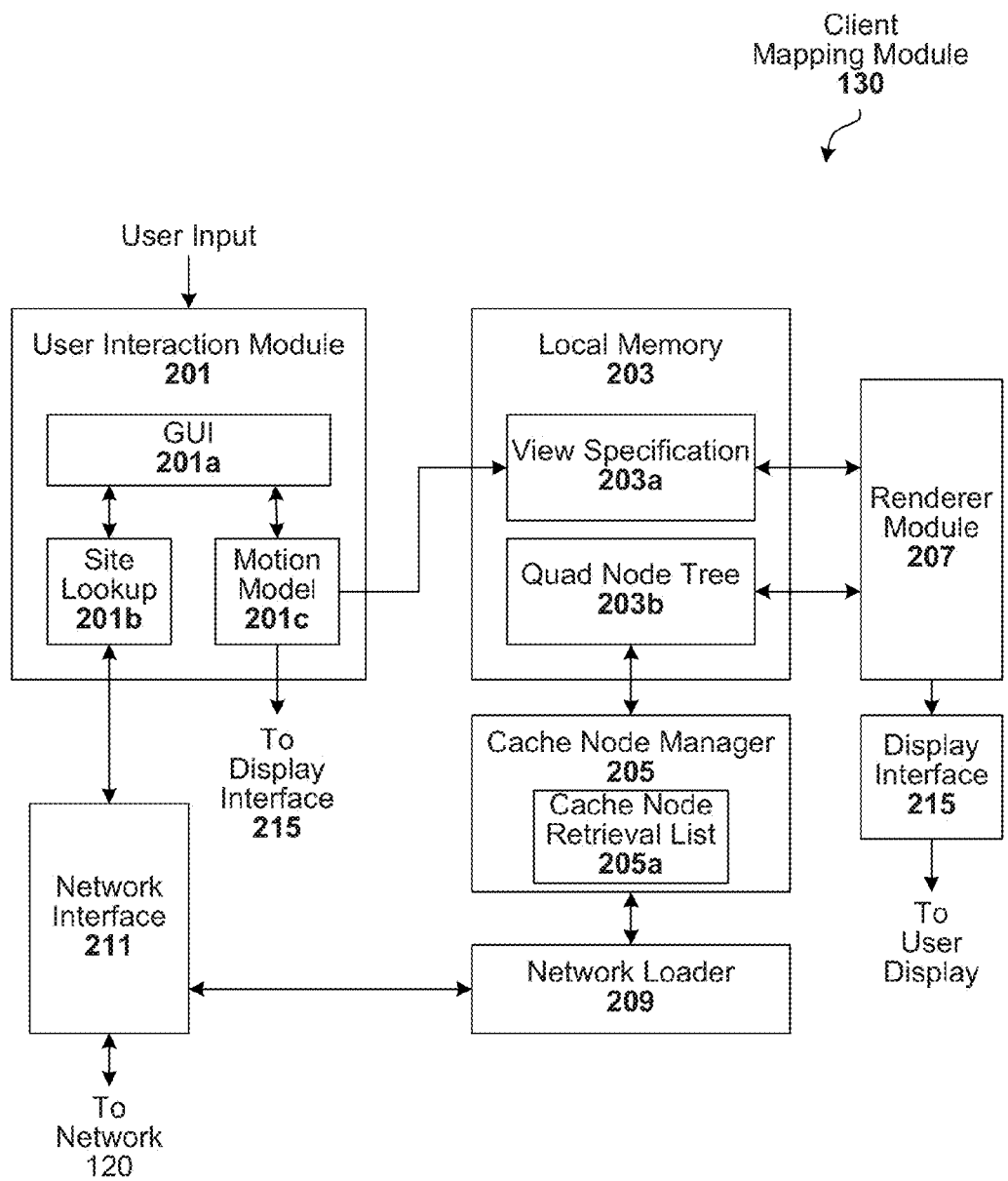
FIG. 2a illustrates a client-side mapping module of the GIS shown in FIG. 1, configured in accordance with an embodiment of the present invention.

FIG. 2a illustrates a client-side mapping module 130 of the GIS shown in FIG. 1, configured in accordance with an embodiment of the present invention. As previously explained, components of the mapping module 130 can be implemented as software running on a user's computer (client 125), which then interacts with a GIS server system to bring images of the Earth and other geospatial information to the client 125 for viewing by the user. In operation, and in one particular configuration, various software objects are grouped in modules according to several functions that can run asynchronously (time independently) from one another. Numerous software implementations and functional module interactions will be apparent in light of this disclosure. As will be understood by those of skill in the art, the functional modules can be implemented in hardware as well, including as dedicated circuits or combinations of processors and stored microcode, or both.

As can be seen, the module 130 includes a user interaction module 201, a local memory 203, a cache node manager 205, a renderer module 207, a network loader 209, a network interface 211, and a display interface 215. In general, the user interaction module 201 receives user input regarding the location that the user desires to view, and through a motion model 201c, constructs a view specification 203a. In the renderer module 207, the renderer draws whatever drawable data has been previously brought back to the user's computer, except that the renderer uses the view specification 203a to decide what not to draw from that data. The cache node manager module 205 runs in an asynchronous thread of control. The cache node manager module 205 builds a quad node tree 203b by populating it with quad nodes retrieved from the remote server system (via network 120). Each of these and other modules will now be described in further detail.

The user interaction module 201 includes a graphical user interface (GUI) 201a, an optional site lookup routine 201b, and a motion model 201c. In the user interaction module 201, the user inputs location information using the GUI 201a, which results in the generation of the view specification 203a, as will be described in turn. The view specification 203a is placed in local memory 203, where it is used by a renderer in the renderer module 207, as also will be described in turn. The GUI 201a is discussed in further detail with reference to FIG. 3.

Certain types of user input, including addresses and the names of well known places typed into a text input field of the GUI 201a, trigger an optional site lookup routine 201b. The site lookup routine 201b sends the address or name to the GIS server system 105 (via network 120), and in response, the latitude and longitude corresponding to the address or name is returned to the client mapping module 130. If a user has selected a geographical location by double-clicking on it within the display window of the GUI 201a, then the latitude and longitude corresponding to the selected location on the 3D map can be determined locally. In one particular embodiment, a default altitude over the selected location is used. A user can adjust the default altitude using the GUI 201a (e.g., zoom controls), as desired.

The motion model 201c uses location information received via the GUI 201a to adjust the position and orientation of a "virtual camera" viewing the displayed 3D map. The user sees the displayed 3D map on his or her computer monitor from the viewpoint of this virtual camera. The motion model 201c also determines the view specification 203a based on the position of the virtual camera, the orientation of the virtual camera, and the horizontal and vertical fields of view of the virtual camera.

The view specification 203a defines the virtual camera's viewable volume within the 3D space, known as a frustum and herein referred to as a visual environment, and the position and orientation of the frustum with respect to the 3D map, herein referred to as a virtual camera viewpoint. The frustum is in the shape of a truncated pyramid. The frustum has minimum and maximum view distances that can change depending on the viewing circumstances. As the user's view of the 3D map is manipulated using the GUI 201a, the orientation and position of the visual environment changes with respect to the 3D map. Thus, as user input is received, the view specification 203a changes. The view specification 203a is placed in local memory 203, where it is used by a renderer in the renderer module 207.

In accordance with one embodiment of the present invention, the view specification 203a specifies three main parameter sets for the virtual camera viewpoint: the camera tripod, the camera lens, and camera focus capability. The camera tripod parameter set specifies the following: the virtual camera position: X, Y, Z (three coordinates); which way the virtual camera is oriented relative to a default orientation, such as heading angle (e.g., north?, south?, in-between?); pitch/tilt (e.g., level?, down?, up?, in-between?); and yaw/roll (e.g., level?, tilt clockwise?, tilt anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In one example operation, and with the above camera parameters in mind, assume the user presses the left-arrow (or right-arrow) key. This would signal the motion model 201c that the view should move left (or right). The motion model 201c implements such a ground level "pan the camera" type of control by adding (or subtracting) a small value (e.g., 1 degree per arrow key press) to the heading angle. Similarly, to move the virtual camera forward, the motion model 201c would change the XYZ coordinates of the virtual camera's position by first computing a unit-length vector along the view direction (HPR), and then adding the XYZ sub-components of this vector to the camera's position XYZ after scaling each sub-component by the desired speed of motion. In these and similar ways, the motion model 201c adjusts the view specification 203a by incrementally updating XYZ and HPR to define the "just after a move" new view position.

The renderer module 207 has cycles corresponding to the display device's video refresh rate, typically 60 Hz (cycles per second). In one particular embodiment, the renderer module 207 performs a cycle of (i) waking up, (ii) reading the view specification 203c that has been placed by the motion model 201c in a data structure accessed by the renderer, (iii) traversing a quad node tree 203b in local memory 203, and (iv) drawing drawable data contained in the quad nodes residing in the quad node tree 203b. The drawable data may be associated with a bounding box (a volume that contains the data, or other such identifier). If present, the bounding box is inspected to see if the drawable data is potentially visible within the view specification 203a. Potentially visible data is then drawn, while data known not to be visible is ignored. Thus, the renderer uses the view specification 203a to determine whether the drawable payload of a quad node resident in the quad node tree 203b is not to be drawn, as will now be more fully explained.

Initially, and in accordance with one embodiment of the present invention, there is no data within the quad node tree 203b to draw, and the renderer module 207 draws a star field by default (or other suitable default display imagery). The quad node tree 203b is the data source for all drawing that the renderer 207 does except for this star field. The renderer 207 traverses the quad node tree 203b by attempting to access each quad node resident in the quad node tree 203b. As explained herein, each quad node is a data structure that has up to four references and an optional payload of data. If a quad node's payload is drawable data, the renderer 207 will compare the bounding box of the payload (if any) against the view specification 203a, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, then the renderer 207 also attempts to access each of the up to four references in the quad node. If a reference is to another quad node in local memory (e.g., memory 203 or other local memory), the renderer 207 will attempt to access any drawable data in that other quad node and also potentially attempt to access any of the up to four references in that other quad node. The renderer's 207 attempts to access each of the up to four references of a quad node are detected by the quad node itself, as will now be explained.

As previously explained, a quad node is a data structure that may have a payload of data and up to four references to other files, each of which in turn may be a cache node. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., included in GIS server system 105) and there is no drawable data present on the user's computer. The files referenced by a quad node are referred to herein as the children of that quad node, and the referencing quad node is referred to herein as the parent.

Quad nodes and cache nodes have built-in accessor functions. As previously explained, the renderer's 207 attempts to access each of the up to four references of a quad node are detected by the quad node itself. Upon the renderer's 207 attempt to access a child quad node that has a filename but no corresponding address, the parent quad node places (by operation of its accessor function) that filename onto a cache node retrieval list 205a. The cache node retrieval list 205a comprises a list of information identifying cache nodes to be downloaded from the GIS server system 105. If a child of a quad node has a local address that is not null, the renderer uses that address in local memory 203 to access the child quad node.

Quad nodes are configured so that those with drawable payloads may include within their payload a bounding box or other location identifier. The renderer 207 performs a view frustum cull, which compares the bounding box/location identifier of the quad node payload (if present) with the view specification 203a. If the bounding box is completely disjoint from the view specification 203a (i.e., none of the drawable data is within the frustum), the payload of drawable data will not be drawn, even though it was already retrieved from the GIS server system 105 and stored on the user's computer. Otherwise, the drawable data is drawn. The view frustum cull determines whether or not the bounding box (if any) of the quad node payload is completely disjoint from the view specification 203a before the renderer 207 traverses the children of that quad node. If the bounding box of the quad node is completely disjoint from the view specification 203a, the renderer 207 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from the view specification 203a.

Quad node and cache node payloads may contain data of various types. For example, cache node payloads can contain satellite images, text labels, political boundaries, 3-dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent.

The cache node manager 205 thread and each of one or more network loader 209 threads operate asynchronously from the renderer module 207 and the user interaction module 201. The renderer module 207 and user interaction module 201 can also operate asynchronously from each other. In some embodiments, as many as eight network loader 209 threads are independently executed, each operating asynchronously from the renderer module 207 and user interaction module 201. The cache node manager 205 thread builds the quad node tree 203b in local memory 203 by populating it with quad nodes retrieved from the GIS server system 105 by network loader 209 threads. The quad node tree 203b begins with a root node when the client mapping module 130 is launched or otherwise started. The root node contains a filename (but no corresponding address) and no data payload. As previously described, this root node uses a built-in accessor function to self-report to the cache node retrieval list 205a after it has been traversed by the renderer 207 for the first time.

In each network loader 209 thread, a network loader traverses the cache node retrieval list 205a (which in the embodiment shown in FIG. 2a is included in the cache manager 205a, but can also be located in other places, such as the local memory 203 or other storage facility) and requests the next cache node from the GIS server system 105 using the cache node's filename. The network loader only requests files that appear on the cache node retrieval list 205a. The cache node manager 205 allocates space in local memory 203 (or other suitable storage facility) for the returned file, which is then organized into one or more new quad nodes that are descendents of the parent quad node. The cache node manager 205 can also decrypt or decompress the data file returned from the GIS server system 105, if necessary (i.e., to complement any encryption or compression on the server-side). The cache node manager 205 updates the parent quad node in the quad node tree 203b with the address corresponding to the local memory 203 address for each newly constructed child quad node.

Separately and asynchronously in the renderer module 207, upon its next traversal of the quad node tree 203b and traversal of this updated parent quad node, the renderer 207 will now find the address in local memory corresponding to the child quad node and be able to access the child quad node. The renderer's traversal 207 of the child quad node then progresses according to the same steps that were followed for the parent quad node. This continues through the quad node tree 203b until a node is reached that is completely disjoint from the view specification 203a or is considered inappropriate to draw based on other factors as previously explained.

In this particular embodiment, note that there is no communication between the cache node manager 205 thread and the renderer module 207 other than the renderer's 207 reading of the quad nodes written or otherwise provided by the cache node manager 205 thread. Further note that, in this particular embodiment, cache nodes and thereby quad nodes continue to be downloaded until the children returned contain only payloads that are completely disjoint from the view specification 203a or are otherwise unsuitable for drawing, as previously explained.

The network interface 211 (e.g., network interface card or transceiver) is configured to allow communications from the mapping module 130 to be sent over the network 120, and to allow communications from the remote server system 105 to be received by the mapping module 130. Likewise, the display interface 215 (e.g., display interface card) is configured to allow data from the mapping module to be sent to a display associated with the user's computer, so that the user can view the data. Each of the network interface 211 and display interface 215 can be implemented with conventional technology.

Quad Node Tree

Figure 2B:
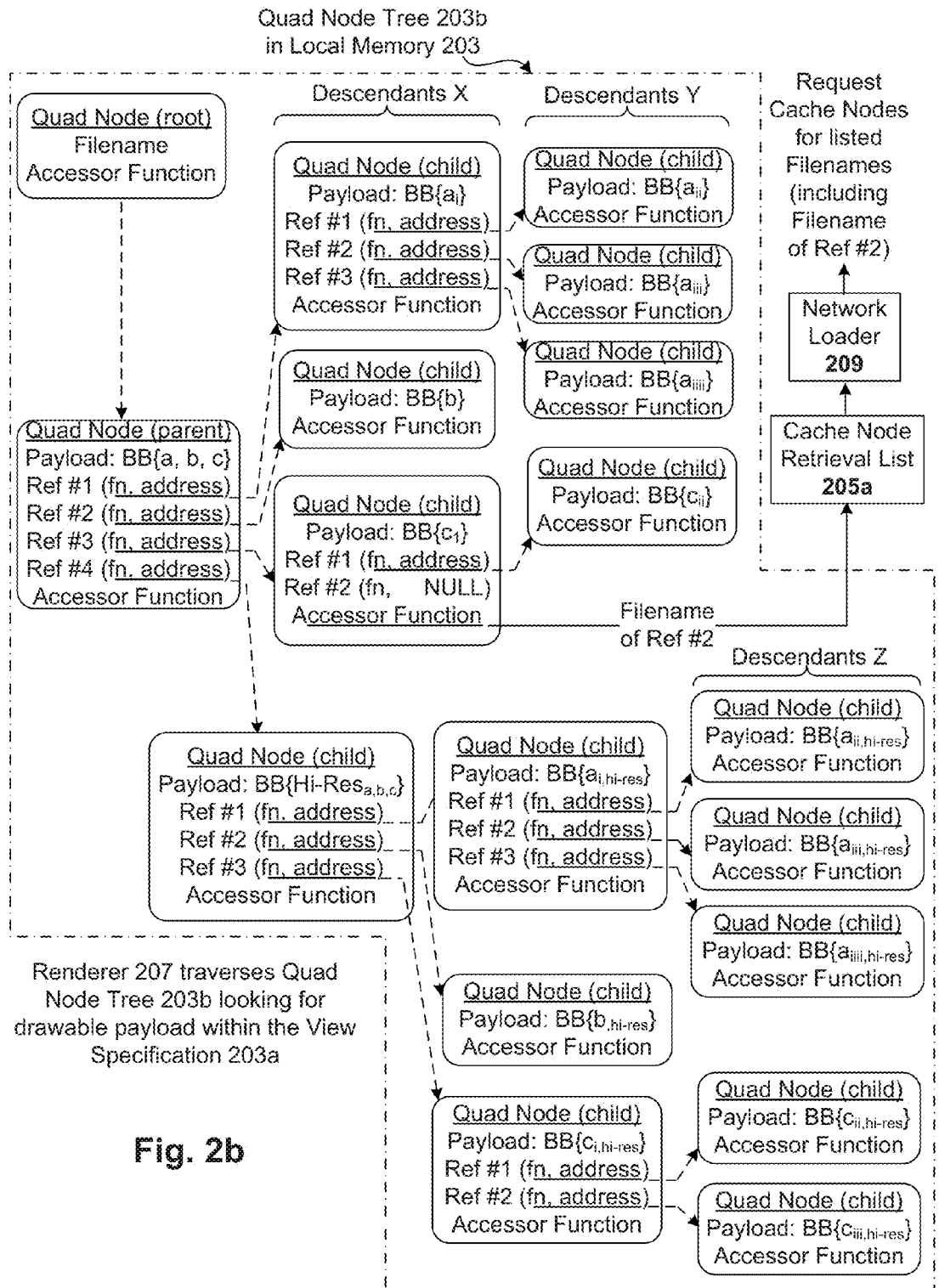
FIGS. 2b and 2c illustrate one example of quad node tree shown in FIG. 1, and a cache node retrieval process, configured in accordance with an embodiment of the present invention.
Figure 2C:
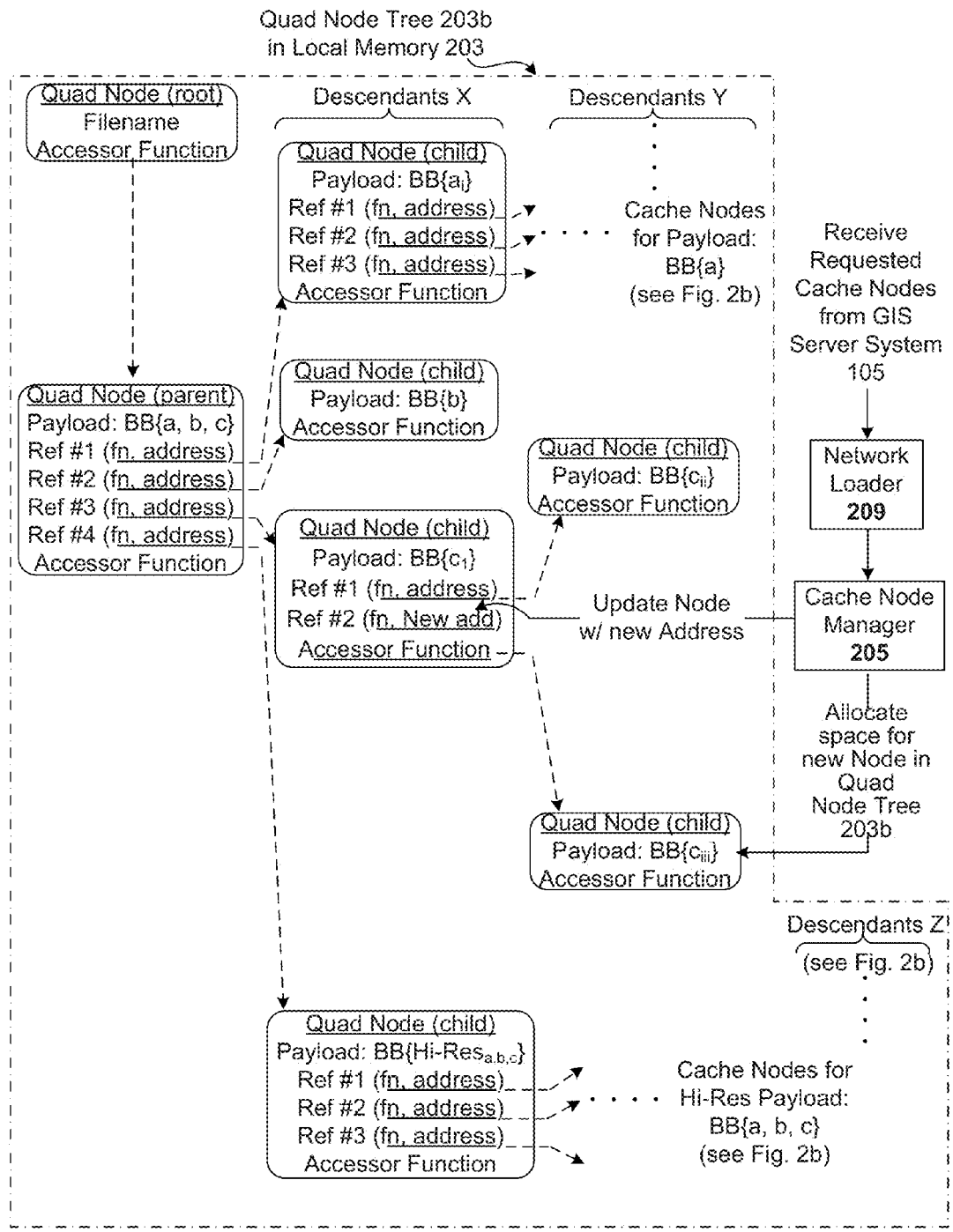

FIG. 2b and FIG. 2c illustrate a one example of a quad node tree 203b shown in FIG. 1, and a cache node retrieval process, configured in accordance with an embodiment of the present invention. As can be seen in FIG. 2b, this example tree 203b currently has a root node, a parent node, four children nodes, and a number of additional descendants from those four children nodes. Each node has a built-in accessor function.

As previously explained, the cache node manager module 205 builds the quad node tree 203b by populating it with quad nodes retrieved from the remote server system 105. The quad nodes used to populate the tree 203b are identified by the renderer 207, which runs asynchronously to the cache node manager 205. In particular, the renderer 207 traverses the quad node tree 203b looking for drawable payload data that is within the current view specification 203a. When the renderer 207 attempts to access a quad node reference that has a filename, but no corresponding local address (such as the case with the root node, or the $3^{rd}$ child node of the "descendants X" shown in FIG. 2a), this triggers the accessor function of that quad node to independently place its own address and the child reference number onto a cache node retrieval list 205a, which comprises a list of information identifying files to be downloaded from the remote server system 105. An independent network loader 209 thread periodically reviews the cache node retrieval list 205a, and requests only the files referenced on the list. It is through these asynchronous processes that the quad node tree 203b is built and maintained during a given user session.

In the example shown, the root node has already been accessed by the renderer 207, which effectively caused the downloading of the parent quad node as explained herein.

This example parent quad node includes a payload and four references (Ref #1, Ref #2, Ref #3, and Ref #4) to other quad nodes, which are the children of that parent. The payload has a bounding box (designated as "BB" in FIGS. 2b and 2c) that includes data "a, b, c." This payload can include, for example, satellite images, text labels, political boundaries, 3-dimensional vertices along with point, line or polygon connectivity for rendering roads, and other types of data as will be apparent in light of this disclosure. The data is designated with "a, b, c" in this example only to show how data can be represented using multiple quad nodes when the data cannot fit in a single quad node, and is not intended to implicate any particular node/tree/data structures or types. Each reference includes a filename (fn) of a child node, and an address in local memory 203 where that file can be located.

Once the renderer 207 accesses the parent node and determines that its payload is drawable and not completely outside the frustum of the view specification 203a, it draws that payload. The renderer 207 also accesses each of the four reference files, thereby creating a generation of child nodes (generally designated as descendants X in FIGS. 2b and 2c), which includes four children. From top to bottom: the first child node includes payload having a bounding box that includes data designated with $a_i$ and three reference files (Ref #1, Ref #2, and Ref #3); the second child node includes payload having a bounding box that includes data designated with b and no reference files; the third child node includes payload having a bounding box that includes data designated with $c_i$ and two reference files (Ref #1 and Ref #2); and the fourth child node includes payload having a bounding box that includes high-resolution (Hi-Res) data designated with a, b, c and three reference files (Ref #1, Ref #2, and Ref #3).

Each of these descendant X children nodes is accessed in turn by the renderer 207, so that the respective payloads can be drawn (if appropriate) and reference files can be accessed (if appropriate). In this example, when the renderer 207 accesses the second reference (Ref #2) of the $3^{rd}$ child node of the descendants X shown in FIG. 2b, it encounters a filename with a NULL address. As previously explained, this triggers the accessor function of that $3^{rd}$ child node to independently place its own address and the corresponding reference number (Ref #2) onto the cache node retrieval list 205a. The network loader 209 then causes the listed files (including the file associated with Ref #2) to be downloaded from the remote server system 105. As can be seen in FIG. 2c, the requested file is received via the network loader 209 and provided to the cache node manager 205. The cache node manager 205 then allocates space in local memory 203 for the returned file, and organizes it into a new child quad node (included in descendants Y), which is a descendent of the $3^{rd}$ child node of descendants X. The cache node manager 205 also updates the $3^{rd}$ child node with the new address (New add) of that allocated space.

Once the quad node for Ref 2 is created by operation of the cache node manager 205, the child nodes of descendants Y include eight children. From top to bottom: the first child node includes payload having a bounding box that includes data designated with $a_{ii}$ and no reference files; the second child node includes payload having a bounding box that includes data designated with $a_{iii}$ and no reference files; the third child node includes payload having a bounding box that includes data designated with $a_{iiii}$ and no reference files; the fourth child node includes payload having a bounding box that includes data designated with $c_{ii}$ and no reference files; the fifth child node includes payload having a bounding box that includes data designated with $c_{iii}$ and no reference files; the sixth child node includes payload having a bounding box that includes high resolution data designated with $a_{i,hi-res}$ and three reference files (Ref #1, Ref #2, and Ref #3); the seventh child node includes payload having a bounding box that includes high resolution data designated with $b_{,hi-res}$ and no reference files; and the eighth child node includes payload having a bounding box that includes high resolution data designated with $c_{i,hi-res}$ and two reference files (Ref #1 and Ref #2).

Descendants Z include the child nodes specified by the references of the sixth and eighth child nodes of descendants Y, include additional high resolution payload data for a and c, as can be seen. The renderer 207 will process the high resolution quad nodes, depending on the data requested by the user. In general, higher zoom levels (lower viewing altitudes) require higher resolution image data.

Graphical User Interface

Figure 3:
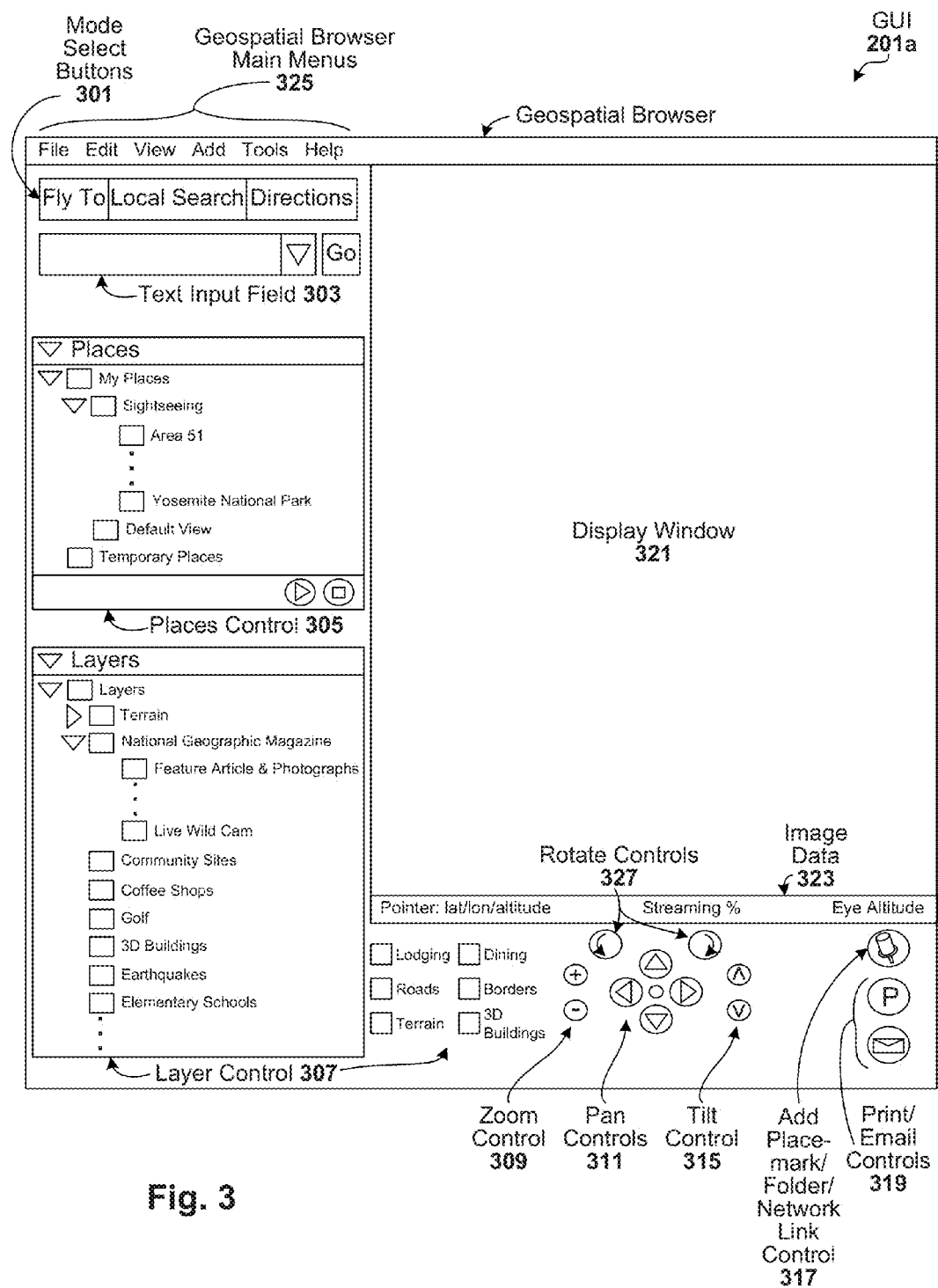
FIG. 3 illustrates one particular embodiment of the GUI which operates as a geospatial browser.

The GUI 201a is used to receive input from a user. FIG. 3 illustrates one particular embodiment of the GUI 201a, which operates as a geospatial browser that includes a display window 321 for displaying a 3D map, and a text input field 303 for entering location information such as latitude and longitude, an address and/or zip code, or the name of a well-known site (e.g., "Lincoln Memorial" or "Area 51"). The GUI 201a has a number of modes in which it can operate, including Fly To mode, Local Search mode, and Directions mode, as shown by mode select buttons 301. Fly To mode is shown in FIG. 3, where any location (e.g., New York City or a zip code or the "White House") can be entered into field 303, and the display window 321 will automatically zoom out and then slide over to and then zoom in to the target location, giving the effect of virtual flying (as the display window 321 shows imagery of the route from the current location to the target location). The Local Search mode allows the user to search for local businesses (e.g., "pizza") and points of interest (e.g., museums) in either the currently viewed location, or in a user-specified location (in this mode, a first text input field can be provided to indicate what is being searched for and a second text input field can be provided to indicate where to search). The Directions mode allows the user to specify start and stop locations (in this mode, a first text input field can be provided to indicate the start location and a second text input field can be provided to indicate the stop location), and then provides a map and written directions for traveling between those locations.

The GUI 201a also includes a zoom control 309 for adjusting the viewing altitude, a tilt control 315 for adjusting the viewing angle, rotation controls 327 for rotating the view left and right, and a set of panning controls 311 to view areas of the 3D map to the left, right, top or bottom of the display window.

The GUI 201a also includes places control 305, which allows the user to organize saved data in a Places panel in a way similar to how a user would organize files and folders on a computer's hard drive. For example, the places control 305 allows the user to create folders, reorder placemarks or folders, rename a placemark or folder, remove/delete a placemark or folder, and empty a folder's contents. Also, the user can select (e.g., check box or other such GUI control mechanism) various places designated in the places control 305, and then select a "play" function button (lower right of places control 307 panel) so that a virtual tour of those selected places will then be displayed in the window 321. Stop and pause functions can also be provided to give the user more control over the virtual tour. As will be explained in turn, navigation of such user-defined paths can be computed by the mapping module 130.

The GUI 201a also includes layer control 307, which provides a variety of data points of geographic interest (e.g., points of interest, as well as map, road, terrain, and building data) that a user can select to display over the viewing area. In the embodiment shown in FIG. 3, example commonly used layers are available on the Navigation panel (e.g., Lodging, Dining, Roads, Boarders, Terrain, and 3D Buildings) and a full list of layers is available in the Layers panel (e.g., National Geographic Magazine articles relevant to a particular area, Golf courses/ranges, Coffee Shops, Community Sites, earthquake epicenters, etc).

The GUI 201 of this example embodiment also displays image data 323 in the lower portion of the display window 321, including pointer/cursor coordinates (e.g., lat/lon/altitude), streaming percentage completion, and eye altitude (e.g., feet). The eye altitude data is particularly useful when the user is adjusting tilt control to get a closer look at a target location, in that the user knows how close to the ground the current view is based on the current eye altitude. The GUI 201a further includes print and email controls 319 (so as to allow for printing and emailing of locations and/or images). Also, the GUI 201a includes an add placemark/folder/network link control 317, which allows the user to create or otherwise add new placemarks, folders, and/or network links. The geospatial browser main menus 325 include the File menu (e.g., functions such as Open, Save, Save As, Email/ Email View, Share with Online Community, Print, Logout), Edit (e.g., includes functions such as Find in Places, Find Next, Find Prev, Copy, Snapshot View, Past Delete, Rename, Refresh, Apply Style Template, Delete Content, Save to My Places, Clear Search History, and Properties), View (e.g., includes functions and selectable display features such as Full Screen, View Size, Compass, Status Bar, Lat/Lon Grid, Overview Map, and Play Tour), Add (e.g., includes functions to allow the addition of Placemarks, Folders, Image Overlays, and Network Links), Tools (e.g., includes selectable tools such as Navigation panel, Places panel, Layers panel, Measuring tool, and Web Search panel), and Help (e.g., includes access to online help center and other informative sources). Note that the add placemark/folder/network link control 317 can be configured to provide menu options that correspond to the options in the Add menu of the geospatial browser main menus 325. Further note that various places and layers of the Places and Layers panels can be expanded (or condensed) to show additional (or fewer) sub-places and sub-layers (e.g., click GUI arrow pointing at place/layer label to expand or show sub-places/sub-layers, or click GUI arrow pointing down to condense or hide sub-places/sub-layers).

Numerous GUI configurations and underlying functionalities will be apparent in light of this disclosure, and the present invention is not intended to be limited to any one particular configuration. The displayed 3D maps can be manipulated using the GUI 201a. The GUI 201a can be used to reposition the current map view, for example, by clicking and dragging in the display window 321. A user may also select a geographical location by double-clicking on it within the display window 321.

3D Buildings

As previously explained with reference to FIG. 3, the Layers panel includes a variety of data layers that can be selected to display over the viewing area. Example data layers include points of interest as well as map, road, terrain, and 3D buildings. The 3D buildings can be generated (as will be discussed with reference to FIG. 5) for a number of major cities such as Boston, London, Sidney, Washington, D.C., and San Francisco, to name a few.

To view these 3D buildings, the 3D building layer is turned on by selecting the check box included in the layer control 307. Then, the viewer is positioned within a reasonable viewing altitude over the target city. In accordance with one embodiment of the present invention, the 3D buildings start to appear from an eye-elevation of 3,000 to 12,000 feet. Recall that the eye altitude meter on the lower right of the 3D viewer (image data 323) can be checked to determine the current viewing height. The 3D buildings appear as light grey objects over the imagery of the city. As the user zooms in, more details will appear until the entire shape of a building can be seen. The tilt control 315 and rotate controls 327 can be used to get the desired view of the buildings.

Streaming and Interactive Visualization of Filled Polygon Data

Another embodiment of the present invention is a method for streaming and interactive visualization of filled polygon data. The method can be used, for example, for streaming 2D/3D filled polygon data that have been commonly used for representing protruding (e.g., buildings and bridges) as well as non-protruding (e.g., golf courses and lakes) non-terrain geographic features. After being subjected to a height-based pre-filtering process (only applied to 3D buildings), the input polygon dataset is divided into smaller manageable collections referred to as quads. The geometry in these quads is then simplified to form a set of less complex polygons while minimizing the perceptual loss and providing interactive frame rates on the client software.

Conventional systems that provide 3D buildings download the buildings, typically from a local disk. The 3D buildings are then loaded into an application for processing. The analogy here would be loading an entire encyclopedia into the application.

In accordance with an embodiment of the present invention, the data is streamed incrementally to the mapping module 130 as the user "flies" around, and the GIS server system 105 sends only a small subset of the overall database. By analogy, one example embodiment might load all of the first 100 topics of encyclopedia volume "A," the first paragraphs of the next 400 topics, the first sentence of the next 2000 topics, and only the information on the spine of the next few volumes. As the user moves around within the area/topics, the center of the user's "information oasis" changes. By the time the user gets to the end of "Z" then the mapping module 130 would have just the opposite of the starting configuration. The hierarchy of abstractions and simplifications is referred to herein as "levels of detail." These levels of detail are computed in the data processing system (e.g., of GIS server system 105) in advance, so that later, the server system 105 can stream a small and steady amount of information to millions of client 125 applications so that each one can reconstruct just the nearby buildings based on their particular view specification 203a (e.g., position, orientation, etc.) and on the available power of their computer system (e.g., low power notebook, powerful notebook, deskside, gamer's deskside).

As can be seen, the method includes a number of stages by which complex polygon data is converted to simplified polygon data. The stages include asset creation 503, height-based pre-filtering 505, clipping on quad boundaries 507, and feature-preserving simplification 509. Each of these stages or modules can be implemented, for example, as a set of executable instructions running on the GIS server system 105.

Asset Creation 503: Before applying any algorithm to the complex polygon dataset, that dataset is ingested into the system by creating a vector asset. This process creates an optimized representation of the complex polygon source data inside of the interactive GIS. Asset creation can be carried out using conventional techniques for integrating a data set into a system for subsequent processing.

Height-based Pre-filtering 505: The building datasets are subjected to an additional height-based pre-filtering process. Building polygons are first grouped by their relative height (height above the terrain). This is done so as to preserve the skylines for urban cities. Most cities have a very well defined skyline that is visible from a long distance. This skyline is primarily composed of tall buildings. The grouping can be made, for example, based on a predefined scheme that includes a height range for each group (e.g., 10 feet intervals starting at one story buildings and continuing to N story buildings, with the highest floor at 10×N). The shorter the range per group, the greater the height sensitivity provided by the interactive system, and the more accurate the virtual skyline will be.

Figure 6:
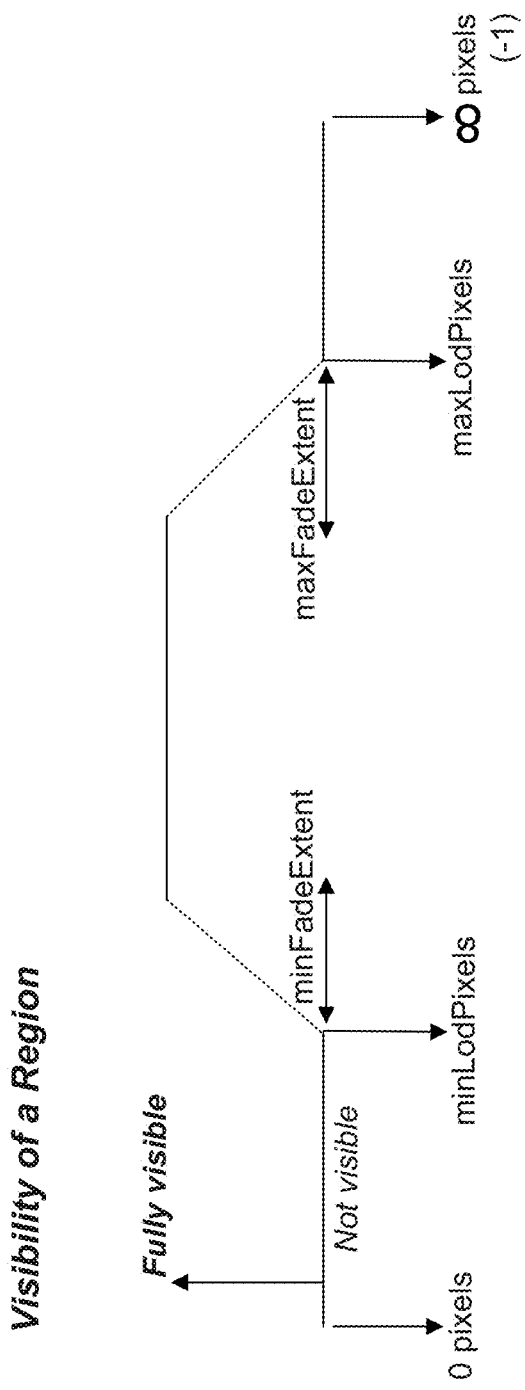
FIG. 6 illustrates the visibility of activated regions and associated data object based on the LOD definition and Fade-Extents using the above example.

Clipping on Quad Boundaries 507: In order to process large amounts of polygon data quickly, the data is indexed spatially and divided into smaller sets. These smaller sets are referred to herein as quads. Each quad is represented by a quad node in the quad node tree 203b as previously discussed. The biggest challenge in dividing the data into quads is avoiding introduction of cracks in the dataset. A certain fraction of polygons fall on quad boundaries and need to be clipped. The clipping process generates additional geometry in the form of newly introduced vertices and edges in the interior of the polygons. These vertices and edges are flagged as being internal. For the actual clipping process, one particular embodiment implements the Liang-Barsky polygon clipping algorithm (although other suitable clipping algorithms can be used) followed by a degenerate edge removal post-process. FIG. 6 visually illustrates this clipping process. Polygons in marked area have been selected as being inside the quad. Note that the dashed border around the polygons is drawn in to designate the quad area for purposes of discussion, and otherwise would not be shown.

Feature-Preserving Simplification 509: This process includes a number of aspects, including elimination of collinear vertices, volume-based simplification of 2.5D polygons (extruded 2D geometry, such as buildings), shape-preserving simplification of 2D polygons, shape-preserving simplification of 3D polygons, and view-dependent simplified sets. Each will now be discussed in turn.

Elimination of collinear vertices—Once the polygons are clipped, they are subject to a decimation process. Typically, vendors introduce large number of collinear vertices (e.g., 20-40%) in their polygon data. These vertices increase the dataset without providing any meaningful information. In accordance with one embodiment of the present invention, the collinear vertices that are contiguous are eliminated by setting a threshold on the amount of angular variation in contiguous line segments defined by these vertices. Additional thresholds can be set for preserving very close and almost collinear vertices that are used to represent curved surfaces.

Volume-based simplification of 2.5D polygons (extruded 2D geometry, such as buildings)—In order to preserve the overall density of the visible buildings while providing interactive visualization at every level i of detail, the overall volume enclosed by the features can be preserved. This gives a good balance between preserving important structures and maintaining a good frame-rate. Polygons are sorted based on the volumes enclosed. Polygons enclosing less volume are eliminated at that level based on a simplification factor that is a function of the level i of detail required. Polygons generated as a result of clipping are not eliminated. This is done so as to make sure that partial buildings at quad boundaries are seen where one quad is rendered at a higher level of detail and the adjacent quad is rendered at a lower level of detail.

Quads that are simplified are re-introduced with the original detail again two levels below (Level i+2). Further simplification is accomplished by aggregating buildings into city blocks. This is done only at lower levels of detail where the features begin to occupy sub-pixel space in the display window 321.

Shape-preserving simplification of 2D polygons—For 2D polygons, the goal is to preserve the shape of the feature. In accordance with one embodiment of the present invention, a simplification here works on a per-polygon basis. Vertices are classified as critical/non-critical based on the angle subtended by the line-segments containing the vertex and also the lengths of the line segments themselves. In order to avoid introducing cracks, vertices at the quad boundaries are not eliminated.

Shape-preserving simplification of 3D polygons—Non-extruded structures such as pyramid-shaped buildings, bridges, etc are usually represented as triangulated irregular networks. One embodiment of the present invention simplifies such datasets by replacing complex triangle meshes with simpler ones, while preserving the shape of the structures. In doing so, the surface curvature of the meshes are taken into account.

View-dependent simplified sets—Server-side simplification cannot take into account the view of the user. Therefore, the server-side algorithms (e.g., of GIS server system 105) cannot perform view-dependent simplification. Thus, in one embodiment, the server system 105 creates simplified sets of geometry based on different camera positions/orientations. At runtime, the mapping module 130 of client 125 can choose the set that best matches the current camera pose.

KML

The interactive GIS described herein supports a number of display features for rich presentation of GIS data. All of the features supported by the GIS can be described in KML. KML, or Keyhole Markup Language, is a hierarchical XML-based grammar and file format for modeling, storing, and displaying geographic features such as points, lines, images, and polygons for display by the client 125. KML controls elements that appear in the 3D viewer (e.g., browser 125a) and the Places pane (e.g., as discussed with reference to FIG. 3).

In accordance with one particular embodiment, the client 125 downloads one or more KML files from the GIS server system 105 when presenting GIS data. In addition, the client 125 can download KML files from other servers on the network 120. Moreover, an end-user can use the client 125 to create KML files and optionally share the files with the server system 105 and/or other clients 125 via the network 120 and/or other means.

In one embodiment, files containing KML are encoded in a default file format referred to as "KMZ." KMZ is a compressed file format and in one embodiment uses compression based on the common ZIP file formats. Other compression schemes can be used as well. A single KMZ file can contain one or more constituent files that are extracted when the KMZ file is utilized. A benefit of using KMZ is that all of the images and other data utilized to create a particular presentation of GIS data are self-contained within a single file that can be easily shared among the GIS server system 105 and clients 125.

KML can be authored in a number of ways, depending upon the desired purpose. Three particular examples include using a text editor, using a client 125, and using a development environment to generate KML programmatically, each of which will now be discussed in turn.

Use a text editor—A text editor can be used to create KML as a way to create simple file prototypes, or to test out the validity of a particular KML document syntax or structure. For quick KML syntax checking in accordance with one particular embodiment, right-click on a placemark or overlay in the GUI 201a and select Copy from the pop-up menu. Then, open a simple text document and paste the KML contents into it for a quick and easy way to view KML generated by the client 125.

Use client 125 to author data—To create KML for distribution by email or to host as non-dynamic content on a web server, use client 125. In particular, structure the data as desired in the GUI 201a and save it as a separate file (KMZ). This is also a useful way to determine the best structure for more complex KML documents that can be authored programmatically. The client 125 can create and save all but a few KML tags, in accordance with one particular embodiment. Recall that the mapping module 130 on a client 125 may be further configured with a development module that an end-user can use to generate KML and save the KML in a KMZ file, a discussed in more detail in the previously incorporated U.S. Pat. No. 7,353,114.

Use a development environment to generate KML programmatically—Any favored development environment (e.g., php, Java servlets) can be used to author KML content for delivery via the web, much in the same way that other dynamic web content is created. Most content editors that display XML data can do the same for KML.

The following is an example KML file:

```
<kml xmlns="http://earth.google.com/kml/2.0">
<Placemark>
  <description><![CDATA[<a href="http://www.google.com/">Google
Search!</a>]]></description>
  <name>Google Headquarters</name>
  <LookAt>
    <longitude>-122.0839</longitude>
    <latitude>37.4219</latitude>
    <range>540.68</range>
    <tilt>0</tilt>
    <heading>3</heading>
  </LookAt>
  <Point>
    <coordinates>-122.0839,37.4219,0</coordinates>
  </Point>
</Placemark>
</kml>
```

In this example, the <kml> element contains a single <Placemark> element named Google Headquarters. When loaded into the client 125, the <Placemark> is displayed as the default icon positioned at the longitude and latitude given by the <coordinates> element. The <LookAt> element of the <Placemark> specifies the "virtual camera" view when displaying the placemark in the 3D viewer (e.g., browser 125a). Note how the <description> text contains HTML tags and a hyperlink. The viewer displays the description and formats it according to the HTML tags and will open clicked hyperlinks in a web browser window (in this example, the Google homepage will open). In accordance with one embodiment of the present invention, this example KML code can be tested by copying and pasting it to a simple text editor and saving it as a file with the extension .kml. Then, drag and drop the file over the 3D viewer of the client 125 to view the results.

In accordance with one particular embodiment of the present invention, KML can be used to:

Specify icons and labels to identify locations on the planet (or other target area) surface.

Create different camera positions to define unique views for each of the displayed features.

Use image overlays attached to the ground or screen.

Define styles to specify feature appearance.

Write HTML descriptions of features—including hyperlinks and embedded images.

Use folders for hierarchical grouping of features.

Dynamically fetch and update KML files from remote or local network locations (Network Link).

Deliver current view details from the client to the server in order to fetch KML data based on changes in the 3D viewer.

A KML file is processed by the client 125 in a similar way that HTML (and XML) files are processed by web browsers. Like HTML, KML has a tag-based structure with names and attributes used for specific display purposes. Thus, the client 125 acts as a browser of KML files.

KML features share a number of common elements: Name, Description, Visibility, View Coordinates, and Snippet, as will now be described.

Name: The KML syntax uses the <name> tag to provide the name of a folder, placemark, overlay, or other features for easy identification in the mapping module 130. The following example shows the <name> element applied to a <Folder> element.

```
<Folder>
  <name>My House</name>
  ...
</Folder>
```

Values of <name> are user-defined, and it can be contained by (i.e., it parent tags): <Folder>, <Document>, <GroundOverlay>, <Placemark>, <ScreenOverlay>, and <Schema>. It has no child tags. The <Schema> element is a complex tag that is used to define a custom schema to enable KML to properly interpret elements in your KML not native to the default KML schema. Using this <Schema> tag and its children, the user can define his own schema as a set of named and typed XML elements. The <Schema> tag has no values and no parent tags, but is parent to the following elements: <name>, <parent>, <ObjField>, <ObjArrayField>, <SimpleField>, and <SimpleArrayField>.

Description: The <description> tag can be used to enter additional information about a feature. This description appears, for example, in the Places panel (of the GUI 201a shown in FIG. 3) when the user clicks on a folder or ground overlay, and in a pop-up window when the user clicks on either a Placemark name in the Places panel, or a placemark icon on the map. The description element supports plain text as well as HTML formatting. In one particular embodiment, the mapping module 130 is programmed or otherwise configured to recognize a valid web URL entered in the description, and to automatically convert the URL to a hyperlink to that URL (e.g., http://www.google.com). Consequently, a URL does not need to be surrounded with the <a href="http:// . . . "></a> tags in order to achieve a simple link (thereby minimizing need for HTML markup). However, the appearance of the descriptive text can be formatted using HTML to provide font styling and even images, if so desired. When using HTML to create a hyperlink around a specific word, or when including images in the HTML, entity references or the CDATA element can be used to escape angle brackets and apostrophes. The CDATA element tells the XML parser to ignore special characters used within the brackets. This element takes the form, for example, of: <![CDATA[special characters here]]>. If it is desired not to use the CDATA element, entity references can be used to replace all the special characters. However, it is most often simplest to use the CDATA element to enclose the entire HTML string rather then to substitute entity references for each special character. The following example illustrates the description tag used to generate the pop-up illustrated above:
    <description><![CDATA[This is an image <img src="C:\Documents and Settings\My Documents\Icons\icon.gif"> and we have a link http://www.google.com.]]></description>
Values of the <description> tag are user-defined. It has no child tags, and can be contained by (i.e., its parent tags): <Document>, <Folder>, <NetworkLink>, <GroundOverlay>, <ScreenOverlay>, and <Placemark>.

Visibility: The <visibility> tag can be used to set the default visibility of a feature (e.g., folder, a placemark, or an overlay) when first opened in the mapping module 130. Visibility applies to all features. However, visibility has special conditions when used on features and overlays within folders. A feature is visible if it and its ancestors have their visibility set to true (1). One can define whether or not to initially display the feature when the user opens the KML file. After opening the KML file, the user has the option to toggle the display of the feature on or off. For example:

```
<Placemark>
  <name>The Home Store, Site #3</name>
  <visibility>0</visibility>
  ....
</Placemark>
```

Values for the <visibility> tag are as follows: 0 sets default visibility off, and 1 sets default visibility on. Parent Tags in which the <visibility> tag can be contained: <Folder>, <Document>, <GroundOverlay>, <Placemark>, and <ScreenOverlay>. The <visibility> tag has no child tags.

View coordinates—The <LookAt> element can be used to specify the view around a given point on the planet surface. The mapping module 130 can set the "camera" view for placemarks, folders, overlays, and other features. When a feature has a specified <LookAt> tag, double-clicking the item in the Places window causes the mapping module 130 to pan or tilt to achieve the specified view. Note that the view for a feature bears no relationship to the coordinates or extent (longitude/latitude) of the feature. For example, a placemark might be positioned in the center of a large plot of land, and the observation coordinates for that placemark might look off toward the left corner of the land rather than directly down over the placemark itself. In fact, the view for a placemark can be set so that the geometry itself is not even in view. This behavior can be used to mark a "camera view" of a particular position that is not associated with any geometry; for example, a view of the north rim of the Grand Canyon. A placemark could even be set in California, and the view for that placemark set in New York. When a feature has no <LookAt> tags, double-clicking the feature causes the mapping module 130 to zoom to a view directly over the feature. The <LookAt> tag is a complex tag that defines the observation coordinates or eye point of a parent placemark, folder, or ground overlay. For example:

```
<LookAt>
  <heading>-0.00895499</heading>
  <tilt>39.4365</tilt>
  <range>214.17</range>
  <latitude>37.3895</latitude>
  <longitude>-122.086</longitude>
</LookAt>
```

The <LookAt> tag has no values, and can be contained by (i.e., its parent tags)<Folder>, <Document>, <Placemark>, and <GroundOverlay>. It can contain the following (i.e., its child tags): <heading>, <latitude>, <longitude>, <tilt> and <range>. The <heading> tag describes the angular distance along the horizon to a viewpoint. This is measured from north. The following example shows a heading due west: <heading>-90</heading>. In one particular embodiment, its values are defined with respect to the observation coordinates (with the value expressed in decimal degrees). It has no child tags. The <latitude> tag defines the distance on the Earth or other target area (e.g., measured in degrees) north or south of the equator (e.g., <latitude>33.3205</latitude>). Its values can also be determined by the observation coordinates of the particular view (with its units expressed in decimal degrees). It has no child tags. The <longitude> tag defines the distance on the Earth or other target area (e.g., measured in degrees) east (positive values above 0 to 180 degrees) or west (negative values below 0 to 180 degrees) of the Greenwich Meridian (e.g., <longitude>-111.965</longitude>). Its values can also be determined by the observation coordinates of the particular view (with its units expressed in decimal degrees). It has no child tags. The <tilt> tag indicates the angle of the eyepoint to the designated point and ranges from 0 to 90. A value of 0 indicates no tilt and the perspective of looking straight down on the object. A value of 90 indicates full tilt and the perspective of a horizon view. The <range> tag determines the distance (e.g., in meters) from the surface (sea level) of the planet at longitude/latitude to the eye point (e.g., <range>909.907</range>). Its values can also be determined by the observation coordinates of the particular view (with its units expressed in decimal degrees). It has no child tags. Note that decimal degrees, meters, etc are used for example embodiments herein, but any standard or other suitable GIS notation can be used, as will be appreciated in light of this disclosure.

Snippet—Use the <Snippet> tag to provide a brief description that appears beneath the feature when that feature is displayed in the Places panel (of GUI 201a of FIG. 3). This tag can be used to create a brief description when it is desired to override the appearance of the <description> element's content in the Places panel. If a placemark contains both a description and a snippet, the snippet appears beneath the placemark in the Places panel, and a description appears in the description balloon. For example:

```
<Placemark>
  <name>New Placemark</name>
  <description>Some Descriptive text.</description>
  <Snippet>Here is some snippet in bold</snippet>
  <LookAt id="khLookAt780">
    <longitude>-90.86879847669974</longitude>
    <latitude>48.25330383601299</latitude>
    <range>440.8490922646644</range>
    <tilt>8.39474026454335</tilt>
    <heading>2.701112047774894</heading>
  </LookAt>
  <styleUrl>#khStyle721</styleUrl>
  <Point id="khPoint781">
    <coordinates>-90.86948943473118,48.25450093195546,0</coordinates>
  </Point>
</Placemark>
```

Values of the <Snippet> tag are user-defined text. Its parent is <Placemark>, and it has no child tags.

Network Links

The <NetworkLink> is a complex tag used to define a referenced KML file on a local or remote network. For example:

```
<NetworkLink>
  <refreshVisibility>0</refreshVisibility>
  <refreshInterval>121</refreshInterval>
  <Url>
    <href>//myServer/Googleearth/example.kmlM.</href>
  </Url>
  <visibility>1</visibility>
  <name>TestNetworkLink</name>
</NetworkLink>
```

There are no values for the <NetworkLink>, and its parent tags includes <Folder> and <Document>. Child Tags include <refreshVisibility>, <refreshInterval>, <Url>, <name>, and <visibility>.

Name: as previously discussed.

Visibility: as previously discussed.

URL: Location of the linked KML file (or other script). As previously explained, network links can reference a KML file either on remote servers (http:// . . . ) or on local networks (\\myServer\ . . . ). The URL tag is a parent to several child tags that control various aspects of the link's behavior. These child tags includes: Refresh Interval, Refresh Visibility, Refresh Mode, View Refresh Mode, and View Refresh Time, each of which will now be described.

Refresh Interval—The <refreshInterval> is a tag used to indicate the period of time to refresh the linked data or overlay (e.g., in seconds). In one particular embodiment, if the value is greater than 0, the URL is refreshed every n seconds. If the value is less than 0, the URL will never be loaded, and if the value is equal to 0, the URL is loaded once. For example:

```
<NetworkLink>
  <refreshVisibility>0</refreshVisibility>
  <refreshInterval>121</refreshInterval>
  <<Url>>//myServer/GoogleEarth/example.kml</<Url>>
  <visibility>1</visibility>
  <name>TestNetworkLink</name>
</NetworkLink>
```

Values for the <refreshInterval> tag are indicated in seconds. If the value is greater than 0, the image or URL is refreshed every n seconds. If the value is less then 0, the image will never be loaded, and if the value is equal to 0, the image is loaded once. Parent Tags in which the <refreshInterval> tag can be contained: <NetworkLink>, <GroundOverlay>, and <ScreenOverlay>. The <refreshInterval> tag has no child tags.

Refresh Visibility—The <refreshVisibility> tag can be used to maintain or ignore the default visibility of features within the KML document to which the network link points. In one particular embodiment, values for the <refreshVisibility> tag are as follows: default value is 0, leaves the visibility within the control of the mapping module 130; set the value to 1 to reset the visibility of features each time the network link is refreshed. For example, suppose an item in the linked KML file has a visibility set to 0 and refresh visibility is on (set to 1). When the file is first loaded into the mapping module 130, the check box next to the item is cleared and the item is not visible in the display window 321 of the 3D browser/viewer. If the user selects the item's check box (e.g., such as the check box shown in the Places panel of FIG. 3) to make it visible in the display window 321 of the 3D browser/viewer, the item will again be cleared once the URL is refreshed. Parent Tags in which the <refreshVisibility> tag can be contained: <NetworkLink>. The <refreshVisibility> tag has no child tags.

Refresh Mode—Network Links can be loaded dynamically in one of three ways: on user request, once on document load, or periodically according to the value of the refresh interval. The <refreshMode> tag sets the type of refresh that is done to a network link or ground overlay, either refreshing upon a designated interval or only once upon loading in the client 125. For example

```
<Url>
  <href>http://www.example.com/geotiff/NE/
MergedReflectivityQComposite.kml</href>
    <refreshMode>onInterval</refreshMode>
    <refreshInterval>30</refreshInterval>
    <viewRefreshMode>onStop</viewRefreshMode>
    <viewRefreshTime>7</viewRefreshTime>
    <ViewFormat>BBOX=[bboxWest],[bboxSouth],[bboxEast],
[bboxNorth],[lookatLon],[lookatLat],[lookatRange],[lookatTilt],
[lookatHeading]</viewFormat>
  </Url>
  . . .
  <Icon>
  <href>http://wdssii.nssl.noaa.gov/geotiff/NW/
MergedReflectivityQComposite_20051005-231649.tif?</href>
    <refreshMode>onInterval</refreshMode>
    <viewRefreshMode>onRequest</viewRefreshMode>
  </Icon>
```

With regard to values, on Interval can be used to indicate a time-based refresh of the KML or the ground overlay. Use once or leave the tag out to indicate refresh only upon loading of the network link or overlay into the client 125. The <refreshMode> tag can be contained by <Icon> and <Url>, and has no child tags.

View Refresh Mode—A view-based query can be returned to the server system 105 either periodically, according to the view refresh interval, or after a set time has elapsed since the "virtual camera" has stopped moving. When active, the mapping module 130 sends an HTTP GET to the source server system 105 with the coordinates of the view window (e.g., display window 321 of FIG. 3) appended as a BBOX value. In this way, the source server system 105 may then return information in the context of the active view. The <viewRefreshMode> tag specifies when the mapping module 130/client 125 should return the view coordinates to the <href> server (of server system 105). In one particular embodiment, values of the <viewRefreshMode> are as follows: on Stop will return the coordinates n seconds after movement in the viewing window has stopped, where n is defined in <viewRefreshTime>. Parent tags in which the <viewRefreshMode> tag can be contained: <url>. The <viewRefreshMode> tag has no child tags. The <href> tag, which is a child of the <Url> element and has no child tags, defines the location of an object such as a network link or the image to be used as an overlay or icon for a placemark (this location can either be on a local file system or a remote web server). In one particular embodiment, parameters of the BBOX are programmable via a <ViewFormat> tag, which provides substantial flexibility and allows compatibility with other existing web services (e.g., Web Mapping Service, or WMS). The <ViewFormat> element can be used to select what view information the mapping module 130 sends to the server 110 in a query, and allows the user to specify how the mapping module 130 formats the query. The <ViewFormat> tag is a child of the Network Link's<Url>, and has no child tags. In one particular embodiment, if this tag is not specified, the information returned is the WMS-style east, south, west, north bounding-box coordinates. With the <ViewFormat> tag, the user can return any of these parameters in whichever order, and also a number of parameters in the <LookAt> element. The following example returns all possible information in a comma-delimited string:

```
<NetworkLink>
  <name>NE US Radar</name>
  <flyToView>1</flyToView>
  <Url>
  <href>http://www.example.com/geotiff/NE/
MergedReflectivityQComposite.kml</href>
    <refreshMode>onInterval</refreshMode>
    <refreshInterval>30</refreshInterval>
    <viewRefreshMode>onStop</viewRefreshMode>
    <viewRefreshTime>7</viewRefreshTime>
    <ViewFormat>BBOX=[bboxWest],[bboxSouth],[bboxEast],
[bboxNorth],[lookatLon],[lookatLat],[lookatRange],[lookatTilt],
[lookatHeading]</viewFormat>
  </Url>
</NetworkLink>
```

Values are user defined, and in one embodiment include the following parameters: [bboxWest], [bboxSouth], [bboxEast], [bboxNorth], [lookatLon], [lookatRange], [lookatTilt], and [lookatHeading]. The </flyToView> tag is a child of <NetworkLink> and <NetworkLinkControl>, and has no child tags. When set, updated KML (or other script) from the 3$^{rd}$ party content server causes the viewer to update to the current view. This tag can be used for such situations as alerts or notifications where the current 3D view in the client is effectively overridden, or in situation where two or more users wish to share each other's links (e.g., virtual rendezvous). Its values are Boolean (e.g., 0 for off, 1 for on). The default value is off if the tag is not specified. In a virtual rendezvous, there is a "lead" client/user and at least one "follower" client/user. The <flyToView> tag operates as a client-side configuration that directs the follower client to fly to whatever the results the lead client is viewing. The 3$^{rd}$ party server being accessed by the lead is generally referred to herein as a rendezvous server. A user wishing to follow the lead of another person exploring the area covered by GIS can enable this feature, for example, by checking a UI checkbox for that particular lead-follow network link (and can disable that link by unchecking). In an alert/notification application, the <flyToView> tag is a child of <NetworkLinkControl> and is returned as part of the contents. This means the 3$^{rd}$ party content server can optionally tell the client to fly to a location (e.g., for alerts or important notifications). The network link fires periodically (e.g., every minute), but most of the time nothing important is returned, so the user's view remains under his control, but in a serious situation, the 3$^{rd}$ party content server sets this <flyToView> tag and the client is forced to (at least start to) fly there. An example use of the <flyToView> tag is as follows:

```
<?xml version="1.0" encoding="UTF-8"?>
<kml xmlns="http://earth.google.com/kml/2.0">
<NetworkLink>
  <name>NE US Radar</name>
  <flyToView>1</flyToView>
  <Url>
  <href>http://www.example.com/geotiff/NE/
MergedReflectivityQComposite.kml</href>
    <refreshMode>onInterval</refreshMode>
    <refreshInterval>30</refreshInterval>
    <viewRefreshMode>onStop</viewRefreshMode>
    <viewRefreshTime>7</viewRefreshTime>
    <ViewFormat>BBOX=[bboxWest],[bboxSouth],[bboxEast],
```

-continued

```
[bboxNorth],[lookatLon],[lookatLat],[lookatRange],[lookatTilt],
[lookatHeading]</viewFormat>
  </Url>
</NetworkLink>
</kml>
```

The <NetworkLinkControl> tag, which has no values and is a child of <Document>, controls the behavior of files fetched via <NetworkLink>. Using this feature, the user can access a number of features via its children, including the <flyTo-View> tag as previously discussed. Other children include, <minRefreshPeriod>, <message>, <cookie>, <linkDescription>, and <linkName>. The <minRefreshPeriod> element can be used as a server throttle to limit the number of fetches to the 3$^{rd}$ party content server to a specified minimum period. For example, if a user sets a link refresh to 5 seconds, the minimum refresh period can be set to 3600 to limit refresh updates to every hour. A <message> enables pop-up messages, such as usages guidelines for a network link can be delivered via the <NetworkLinkControl> tag. In one particular embodiment, the message appears only once each time the network link is loaded into the client, or if the message text is updated on the server. The <cookie> element can be used to append the text to the URL query on the next refresh of the network link. This can be used, for example, in the script to provide more intelligent handling on the server-side, including version querying and conditional file delivery. The <linkName> and <linkDescription> of the network link can also be controlled from the server, so that changes made to the name and description on the client-side can be over-ridden by the server. Example use of <NetworkLinkControl> is as follows:

```
<NetworkLinkControl>
  <message>This is a pop-up message. You will only see this once
  </message>
  <cookie>someCookieText</cookie>
  <linkName>New KML features</linkName>
  <linkDescription><![CDATA[KML now has new features available!]]>
  </linkDescription>
</NetworkLinkControl>
```

View Refresh Time—The <viewRefreshTime> tag specifies the frequency with which to return the view coordinates to the server system 105. Value of the <viewRefreshTime> tag is an integer representing seconds. Parent tags in which the <viewRefreshMode> tag can be contained: <Url>. The <viewRefreshMode> tag has no child tags.

Folders: Most uses of KML employ folders to organize placemarks, screen and ground overlays, and other folders. Folders can be used to quickly identify placemark and overlay groups, to provide a unified view for a group of placemarks and/or overlays. Folders offer a number of elements, and in one particular embodiment include the following:

Name and Description—Each folder can have its own name and description attributes.

Visibility—A switch (0 or 1) that controls whether or not the contents of the folder will be visible in the viewing window when the folder is loaded.

Open—A switch (0 or 1) that controls whether or not the folder will be in an expanded or collapsed state when it is loaded.

LookAt—By setting a virtual camera view for a folder, a consistent display can be provided for all the features within the folder, regardless of the camera view set for the individual features. For example, assume different views are specified for a collection of placemarks to highlight characteristics of each placemark. However, with a double-click on the parent folder, the view can shift to one designed to best display all placemarks as a collected group. In one embodiment, if there is no LookAt specified for a particular folder, double-clicking the parent folder will fly to the superset bounding box of the children of that folder.

Logical containment of related data, and folder nesting—a folder can be used to contain related placemarks, overlays, and other folders. By providing folders with a name and LookAt values, information can be grouped in way to make it easily identifiable and manageable. For example, a folder can be used to associate a placemark with a related overlay image file for a multi-layered view of a particular region.

Also, a hierarchical structure can be created in a manner similar to the Microsoft Windows folder view, so that folders can be expanded or collapsed to reveal or hide content as needed. The mapping module 130 can be programmed or otherwise configured to allow a user to drag and drop folders on top of other folders in order to nest them. In KML, <Folder></Folder> tags nest within each other, in the same way that <table></table> tags can be nested in HTML.

The <Folder> is a complex, top-level, optional tag used to structure hierarchical arrangement of other folders, placemarks, ground overlays, and screen overlays. This tag is can be used to structure and organize information in the mapping module 130. For example:

```
<Folder>
  <name>Name of Folder</name>
  <description>Descriptive text</description>
  <Folder>
    <name>SubFolder #1 Name</name>
    <description>Descriptive text</description>
    <Placemark>
     [placemark data here ...]
    </Placemark>
  </Folder>
  <Folder>
    <name>SubFolder #2 Name</name>
    <description>Descriptive text</description>
    <Placemark>
     [placemark data here ...]
    </Placemark>
  </Folder>
</Folder>
```

The <Folder> tag has no values, and can be contained by the following (i.e., its parent tags): <Document>, <Folder>, and <NetworkLink>. The <Folder> tag can contain the following tags (i.e., its child tags): <Folder>, <name>, <description>, <LookAt>, <visibility>, <Placemark>, <GroundOverlay>, <ScreenOverlay>, <NetworkLink>, and <Document>.

Documents: A document is a type of folder that can also contain the <Styles> and <Schemas> tags in addition to features such as placemarks, overlays and folders. Documents can be used to group styles and schemas for a collection. Documents are also often root-level containers of KML hierarchies. When styles or schema are needed for data, the <Document> element can be used to contain these other elements. Styles can be used to add custom icons and color and/or size information to geometry. Schemas can be used when a data collection contains features that are not native to KML. With schemas, a feature and its associated meta-data can be defined so that it is correctly displayed in the mapping module 130. As a root level element for KML documents, the <Document> tag acts as a folder for the elements it contains.

As explained above, this tag can be used if a KML file requires schemas or styles; otherwise, it is not required. For example:

```
<Document>
  <Style id="my_style">
    <Icon>./images/my_image.png</Icon>
  </Style>
  ....
</Document>
```

The <Document> tag has no values and no parent tags. Its child tags include <Folder>, <name>, <description>, <LookAt>, <visibility>, <Placemark>, <GroundOverlay>, <ScreenOverlay>, <NetworkLink>, and <Document>.

Placemarks: Placemarks are the primary means of marking a point on the earth (or other mapped area). A placemark typically has an icon associated with it that marks a point on the target surface such as the Earth; however, a placemark can also be associated with a path, a polygon and/or a 3D shape. The <Placemark> tag is a complex tag used to describe a placemark. Coordinates can be specified as [longitude, latitude, altitude] where: longitude is between −180 and 180; latitude is between −90 and 90; and altitude is in meters from the surface of the spheroid (WGS84, World Geodetic System 1984) which represents the planet (this is roughly sea level; locations below the surface are automatically displaced onto the surface). In addition, a number of other elements can be defined for placemark entries, including observation coordinates, name, and description. For example:

```
<Placemark>
  <name>Queen Creek</name>
  <LookAt>
    <longitude>-111.634</longitude>
    <latitude>33.2407</latitude>
    <range>5571.15</range>
    <tilt>-0.0129749</tilt>
    <heading>-0.0651017</heading>
  </LookAt>
  <visibility>1</visibility>
  <StyleUrl>root://styleMaps#default?iconId=0x300</StyleUrl>
  <Point>
    <coordinates>-111.634,33.2486,413.037</coordinates>
  </Point>
</Placemark>
```

The <placemark> tag has no values, and can be contained by (i.e., its parents)<Folder> and <Document>. It can contain the following tags and their children, where applicable: <description>, <LookAt>, <LineString>, <Multigeometry>, <name>, <Point>, <StyleUrl>, <Style>, and <visibility>. The <LineString> tag defines a line using a string of coordinates. The <Multigeometry> tag is utilized to group more than one geometry element, such as multiple polygons used to define a single feature. The <Point> tag defines the geographic location of a point coordinate. With KML, the style of a placemark can be customized in a variety of ways. The <style> tag specifies styles for placemarks. In addition, the <StyleUrl> tag can be used to reference an externally-defined style. In one embodiment, the <Document> tag can include a <StyleMap> tag with a value that specifies normal and highlighted icons for a placemark, so that the highlight version appears when the cursor moves over the icon. Through the use of these tags, the creator of a KML file can ensure that the presentation of a placemark described by the file will render the same way across all of the clients 125. Through the use of the <style> tag, a KML file can define the appearance of icon, label, line, polygon, and descriptive balloon elements in the viewer. Styles in one embodiment of KML can either be defined locally within the element being affected, or referenced by an ID and reused among many elements. In many cases, it is more efficient to design classes of styles up front and refer to them as needed, using local styles sparingly for one-off effects. Additional style details are provided in the previously incorporated U.S. Provisional Application No. 60/694,529, as well as in the previously incorporated U.S. Pat. No. 7,353,114.

Image Overlays: Image overlays can be described in KML for adding image-based meta-data to the GIS data in the client. There are two types of overlays: Ground overlays and Screen overlays.

Ground overlays are used for information-rich site display such as phased plans or weather maps. Ground overlays are images that are fixed to the planet surface. <GroundOverlay> is complex tag that contains tags for defining and placing an overlay image on the globe (or other mapped area). For example:

```
<GroundOverlay>
  <visibility>0</visibility>
  <Icon>
    <href>C:/GoogleEarth/example.jpg</href>
  </Icon>
  <drawOrder>0</drawOrder>
  <LatLonBox>
    <rotation>36.9994</rotation>
    <north>39.3082</north>
    <south>38.5209</south>
    <east>-95.1583</east>
    <west>-96.3874</west>
  </LatLonBox>
</GroundOverlay>
```

The <GroundOverlay> tag has no values, and can be contained by any abstract folder. It can contain the following (i.e., its child tags): <drawOrder>, <Icon> (required), <LatLonBox> (required), <visibility>, and <rotation>.

A screen overlay is a "floating" image independent of the position of the viewer and is fixed to the screen. <ScreenOverlay> is a complex tag that contains tags for defining and placing an overlay image on the screen. Example KML code for placing an image (with original width, height and aspect ratio) at the exact center of the screen looks as follows:

```
<?xml version="1.0" encoding="UTF-8"?>
<kml xmlns="http://earth.google.com/kml/2.0">
  <ScreenOverlay id="khScreenOverlay756">
    <description>This screen overlay uses fractional positioning to put the
                 image in the exact center of the screen</description>
    <name>Simple crosshairs</name>
    <visibility>0</visibility>
    <Icon>
      <href>http://myserver/myimage.jpg</href>
    </Icon>
    <overlayXY x="0.5" y="0.5" xunits="fraction" yunits="fraction"/>
    <screenXY x="0.5" y="0.5" xunits="fraction" yunits="fraction"/>
    <rotationXY x="0.5" y="0.5" xunits="fraction" yunits="fraction"/>
    <size x="0" y="0" xunits="pixels" yunits="pixels"/>
  </ScreenOverlay>
</kml>
```

The <ScreenOverlay> tag has no values, and can be contained by (i.e., its parent tags)<Folder> and <Document>. It can contain the following (i.e., its child tags): <drawOrder>, <Icon> (required), <visibility>, <rotation>, <size>, <screenXY>, and <overlayXY>.

Common Overlay Features: The following features are shared by both ground and screen overlays: Name, Description, Default visibility, Draw Order Location of image file, Rotation, and Refresh Interval (each now discussed in turn).

Name—As previously explained with reference to the <name> tag, an overlay can have a name.

Description—Likewise, an overlay can have a description, as previously explained.

Default visibility—The display of overlays can be toggled so that multiple overlays in a given location can be used with minimal confusion (as previously discussed with reference to the <visibility> tag).

Draw Order—When using overlapping overlays, the <drawOrder> tag can be used to define the overlay stacking order. In this way, for example, overlay images with black boundary edges or masked boundaries can be assigned a lower number than adjacent overlays so as not to obscure useful information. The <drawOrder> tag is a child of <GroundOverlay> and <ScreenOverlay>. The default value is 0. Overlays with a higher draw order values are drawn on top of overlays with lower draw order values. For example: <drawOrder>0</drawOrder>. Values of the <drawOrder> tag range from 0 to 99. The <drawOrder> tag has no child tags.

Location of image file: As previously explained, the <Url> tag references the overlay image file either locally or remotely, such as on a corporate web server. Remote users do not have to have a local copy of an overlay image if the image is supplied remotely. In this way, real-time updates of overlay data, such as weather or development progress of site plans, can be provided. In one particular embodiment, the following image types are supported: JPG, PNG, GIF, and TIFF (other formats will be apparent in light of this disclosure).

Rotation—In one particular embodiment of the present invention, the rotation of the overlay image can be set. The image can be rotated up to 180 degrees in a clockwise (positive) or counter-clockwise (negative) rotation from north. The <rotation> tag is a tag and child of the <ScreenOverlay>, <GroundOverlay>, and <LatLonBox> elements. It can be used to specify the rotational axis of the image from its center point. Values of the <rotation> tag can range from +/−180 degrees to indicate the rotation of the image from 0, which is the default orientation of the image. The <rotation> tag has no child tags.

Refresh Interval—As previously explained, the <refreshInterval> tag indicates the period of time (e.g., in seconds) to refresh the referenced image. This element can be used, for example, for real-time applications such as web cameras where images are updated on a specific frequency. Both ground overlays and screen overlays may be refreshed using the <refreshInterval> tag.

Other Ground Overlay Features: In KML, ground overlay tags can be placed inside any folder or subfolder in a KML document. Ground overlays support the following elements:

<LookAt>—As with placemarks, the observation coordinates for a ground overlay can be set (as previously discussed).

Mapping Coordinates of the Image Overlay Points—Four coordinates set the edges of the overlay. These coordinates set the North-South (latitude), East-West (longitude) positions of the overlay boundaries. In addition, the overlay's rotation, which is about the center of the overlay, can be indicated. In browser/viewer 125*a*, the user can drag and rotate the overlay in order to set the coordinates, or can enter desired values (e.g., by operation of GUI 201*a* of the mapping module 130).

Other Screen Overlay Features: Screen overlays can be used for a consistent display of information regardless of the viewing placement, such as heads up display, co-branding, or other types of dashboard display. As with ground overlays, multiple screen overlays can be defined and associated with a folder. The position can be defined as an absolute coordinate position in the viewer 125a, or as a percentage of the viewer 125a size. The opacity of a screen overlay can also be set. Screen overlays in accordance with one embodiment of the present invention have one or more of the following additional features:

Screen position—Two mechanisms for screen positioning provide flexibility in different presentation formats. The position of the screen image can be determined using X/Y coordinates either with exact pixels, or as a fraction of the overall screen. The <overlayXY> tag is a simple field and child of the <ScreenOverlay> element; it has no child tags. The <overlayXY> tag defines the coordinate point on the overlay image itself that will be used to map to the screen coordinate. It requires X and Y values, and the units for those values (e.g., either pixels or fraction). For example, <overlayXY x="1" y="1" xunits="fraction" yunits="fraction"/> affects the upper right corner of the image. Used with <screenXY of x="−50" y="0.9" xunits="pixels" yunits="fraction"/>, this measurement places the upper right corner of the image 50 pixels inset from the right edge of the screen and 10% below the top edge of the screen. The x and y components can be specified in one of the following ways: placing an image in the center of the screen:

```
<overlayXY x="0.5" y="0.5" xunits="fraction" yunits="fraction"/>
<screenXY x="0.5" y="0.5" xunits="fraction" yunits="fraction"/>
``` or placing an image at the top left of the screen:

```
<overlayXY x="0" y="1" xunits="fraction" yunits="fraction"/>
<screenXY x="0" y="1" xunits="fraction" yunits="fraction"/>
``` or placing an image at the right of the screen:

```
<overlayXY x="1" y="1" xunits="fraction" yunits="fraction"/>
<screenXY x="1" y="1" xunits="fraction" yunits="fraction"/>.
```

The <screenXY> tag is a simple field and child of the <ScreenOverlay> element; it has no child tags. The <screenXY> tag defines the coordinate points on the screen itself that the overlay image will be mapped to. For example, a screenXY of (−50, 0.9) with an overlayXY of (1,1) places the upper right corner of the image 50 pixels inset from the right edge of the screen and 10% below the top edge of the screen. The x and y components can be specified in one of the following ways: placing an image in the center of the screen:

```
<overlayXY x="0.5" y="0.5" xunits="fraction" yunits="fraction"/>
<screenXY x="0.5" y="0.5" xunits="fraction" yunits="fraction"/>
``` or placing an image at the top left of the screen:

```
<overlayXY x="0" y="1" xunits="fraction" yunits="fraction"/>
<screenXY x="0" y="1" xunits="fraction" yunits="fraction"/>
``` or placing an image at the right of the screen:

```
<overlayXY x="1" y="1" xunits="fraction" yunits="fraction"/>
<screenXY x="1" y="1" xunits="fraction" yunits="fraction"/>.
```

The <size> tag is a simple tag and child of the <ScreenOverlay> element; it has no child tags. The <size> tag is used to indicate the width and height of the overlay image based on the screen size. Use of the size tag is best illustrated by example. To force the image to maintain its native height, width, and aspect ratio, set the values to zero: <size x="0" y="0" xunits="fraction" yunits="fraction"/>. To force the image to retain its horizontal dimension, but to take up 20% of the vertical screen space: <size x="0" y="0.2" xunits="fraction" yunits="fraction"/>. To force the image to resize to 100 px by 500 px: <size x="100" y="500" xunits="pixels" yunits="pixels"/>.

Regions Overview

Regions are a combination of conditional-data and data objects, wherein the conditional-data specifies conditions under which the data objects should be processed by a geographic information system. Conditional-data is specified in association with a data object along with a corresponding mechanism to evaluate the conditional-data within a geographic information system. Based on the result of that evaluation, if the conditions specified by the conditional data are satisfied, the data object is said to be active or activated, and is processed, for display or other operations; otherwise the data object is not active, and is not processed by the geographic information system.

The data objects or conditional-data can contain references to additional data sources such as local files, remote files, network services, data generating devices, and similar mechanisms. In the conditional-data, these references specify the conditions under which the data objects should be processed by a geographic information system. In the data objects, the references further specify child data objects that are expanded by data loading when the conditions specified by the conditional-data associated with the data objects are satisfied.

For example, a region specification may include conditional-data that specifies that the geographic information system should only process the associated data object when the virtual camera viewpoint is below sea level, as defined in the 3D environment containing the data object This region specification causes the system to compute the current camera position's altitude. When the camera viewpoint is at or above sea level, the region is inactive and any data objects associated with the region would not be processed. However, if the current altitude is below sea level, the region becomes active and any associated data objects are processed. Further, if the associated data object includes external references to other child data objects, those external references will be expanded through data loading if the region is active, and executed; otherwise they will not be expanded or loaded if the regions are deemed inactive.

The combined use of conditional-data and data objects in GIS systems extends the ability of geographic information systems to process datasets of size limited only by data availability and the conditional-data specifications. The size complexity of the data objects of a database subset which have been included for processing based on associated conditional-data and thereby loaded may be significantly smaller than the size complexity of the database subset, which may be too large to be processed. This size complexity efficiency which is result of the conditional-data specifications that are created along with the data objects may be devised for optimum image quality, processing efficiency, and performance as opposed to the blind sampling logic used in prior systems.

Since the region specifications are associated with the data objects for which they define conditional-data, the method described herein is referred to as data-driven guarded evaluation. In one particular embodiment, the GIS or DGIS system processing data objects with associated region specifications will be adapted to process the conditional-data that is specified.

In some instances, the GIS or DGIS system processing the data objects may not be adapted to process the conditional-data in the region specification. When the region specification cannot be processed, as in the case of a non-region capable system, the region specification can, in its entirety, be skipped by the GIS or DGIS system to allow all of the data objects to be processed. Likewise, region specifications can be stripped from datasets before processing by a non-region capable GIS or DGIS system. The overall processing flow in these two types of systems can be summarized as follows:

Non-region capable system:
1. Examine next data element.
2. Process the data.

Region-capable system:
1. Examine next data element.
2. Does it contain an associated region specification?
   a. No, process the data.
   b. Yes, do the following steps:
      i. Examine the region type and parameters.
      ii. Evaluate the region based on type and parameters.
      iii. If result of evaluation is TRUE (passes test)
         1. process the associated data.

Thus, in data-driven guarded evaluation, regions associated with data objects are examined, evaluated and loaded independently of other data objects allowing a greater flexibility of use and speed of loading large datasets. Data objects can contain references to child data objects that control the loading and evaluation of the child data objects. However, the evaluation of the region associated with the child data object is independent of the evaluation of the region associated with the parent data object. In a non-region capable system, the region specification are simply skipped and not processed.

Conditional-data in a region specification can be defined using several methods useful in managing complexity of large datasets in a geographic information system. One method defines conditional-data as a three dimensional volume or 'region' with a relative location in the three dimensional environment that must be visible based on a virtual camera viewpoint for the region to be active, and the associated data object to be processed. A three dimensional volume can be defined as a polyhedral volume located in the 3D space; a 2D polygonal footprint extruded along a vector; an analytic volume primitive such as a cube, cone, cylinder, or sphere that may be rotated, scaled and translated as desired; or in other means as will be apparent in light of this disclosure.

Regions Mechanism

Figure 4A:
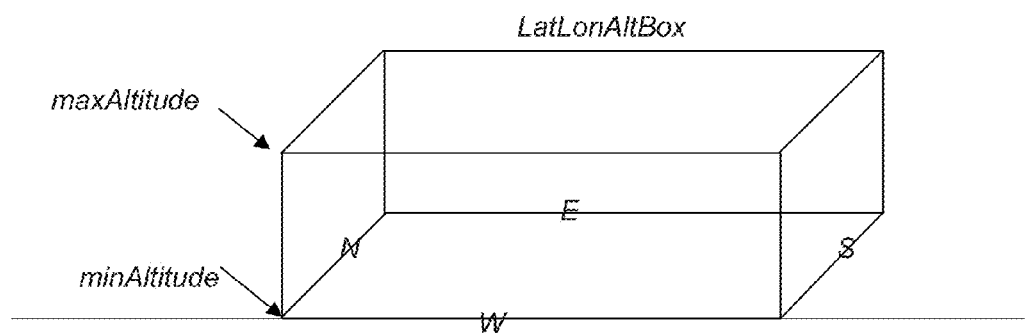
FIG. 4a illustrates one specific embodiment of a conditional-data definition aspect of a region specification as an axis-aligned bounding volume.

One embodiment of regions using conditional-data are through markup tags. Specifically a "region" tag is used to indicate a region specification, and additional tags are used to specify the conditional-data definition. FIG. 4(a) illustrates one specific embodiment of a conditional-data definition aspect of a region specification as an axis-aligned bounding volume in the coordinate frame of latitude, longitude, and altitude with minimum and maximum values for each of latitude, longitude, and altitude. These six values define a rectangular prism volume. In one embodiment such a specification is termed a "LatLonAlt box", and an example of its external expression in the KML markup language (with example values) is as follows:

```
<LatLonAltBox>
    <north>50.625</north>
    <south>45</south>
    <east>28.125</east>
    <west>22.5</west>
    <minAltitude>100</minAltitude>
    <maxAltitude>1000</maxAltitude>
</LatLonAltBox>
```

This conditional-data thus defines a volume that is bordered at the 50.625° on its north face, 45° on its south face, 28.125° on its east face, and 22.5° on its west face, with the top face at 1000 feet above sea level, and the bottom face at 100 feet above sea level, within the currently defined 3D environment in which the region is being used. In cases where the altitude is not defined, the "LatLonAlt" box can have a default altitude setting in which the bounding volume is specified to be at ground level.

In embodiments which use bounding volumes to specify the conditional-data, the mechanism used for testing whether or not the data object associated with the bounding volume defined by the region is active is based on generating a "projection" of the bounding volume onto the two-dimensional display created from the view specification. This projection is used to determine whether or not a bounding volume specified by a region and the data object associated with the region are visible based on the viewpoint of the virtual camera within the 3D visual environment. More specifically, the three dimensional volume defined by the region is projected onto the two dimensional display area that corresponds to the display area of the display device, using display parameters such as display size, camera position, camera angle, camera orientation, and user defined settings. If the bounding volume would be visible, that is, it would be rendered on the display device), then the data object associated with the region is activated.

When generating the projection, three dimensional objects in the geographic information system can be included in the projection to determine visibility of the bounding volume based on the virtual camera viewpoint. If the projection of the bounding volume is fully occluded by three dimensional objects such as terrain defined by the geographic display system in the user's visual environment either between the virtual camera viewpoint and the bounding volume or at the bounding volume, then the associated data object is not activated. However, if the bounding volume is only partially occluded, then the data-object is activated, and if appropriate, is rendered, taking into account, as necessary for such rendering, the occluding object.

As discussed above, all region specifications are processed and evaluated independently. Accordingly, for all regions specified in which conditional-data is defined as bounding volumes projections are generated and evaluated independently of any other bounding volumes. For example, assume that a region specification includes a bounding volume with the coordinates given above. As part of the graphics pipeline for rendering the 3D environment, the renderer may itself define its own bounding volumes for determining which objects to render, and the features of such objects (e.g., color, texture, etc.). The region bounding volumes operate entirely independently of the rendering bounding volumes, in part because they occur at entirely different levels of operation, and for a different reason: the region bounding volumes are defined by the application developer, specified in a markup language, and used to control the display of content to the user, whereas the renderer bounding volumes are defined by the rendered programmatically, specified in an internal representation, and used by the renderer to facilitate high speed processing of the complex objects in the 3D environment.

One useful extension of the region specification is an expansion of the conditional-data to include the definition of additional conditions specifying when a region should be activated and how data objects associated with that region should be processed. A test that evaluates whether a bounding volume specified by a region is visible is combined with a second test that measures the visual prominence of a visible region. This second test allows for the activation of data objects for processing and loading based on the level of detail of the visual environment. Data objects with low prominence due to the level of detail or resolution of the data object can be suppressed even if the bounding volume specified by the region is visible based on the virtual camera viewpoint.

One mechanism used to evaluate the prominence of a region using level of detail of the visual environment is based on the determination of a "projected pixel size" of the region. A "projected pixel size" is the hypothetical maximum size in pixels that a region's defined volume (e.g., LatLonAltBox) would cover if the volume were to be drawn on the display device using the display area, camera position, camera angle and camera orientation as display parameters. The size can be calculated in a number of different ways. In one embodiment, the projected pixel size is estimated as the square root of the pixel area of the region's LatLonAltBox as projected through the camera's projection matrix on the display area $$\left(\frac{1}{range^k}\right).$$

Since such a perspectively-projected pixel size is proportional to $1<=k<=3$ related to the tilt of the virtual camera. A projected pixel size of 0 pixels corresponds to infinite range from the camera to the LatLonAltBox.

A level of detail (LOD) specification associated with the region specification is used to define conditional-data used to activate data objects based of level of detail of the visual environment. Here is an specific example of a LOD specification and its external expression as a LOD tag in the KML markup language:

```
<Lod>
    <minLodPixels>128</minLodPixels>
    <maxLodPixels>1024</maxLodPixels>
    <minFadeExtent>0</minFadeExtent>
    <maxFadeExtent>128</maxFadeExtent>
</Lod>
```

Figure 4B:
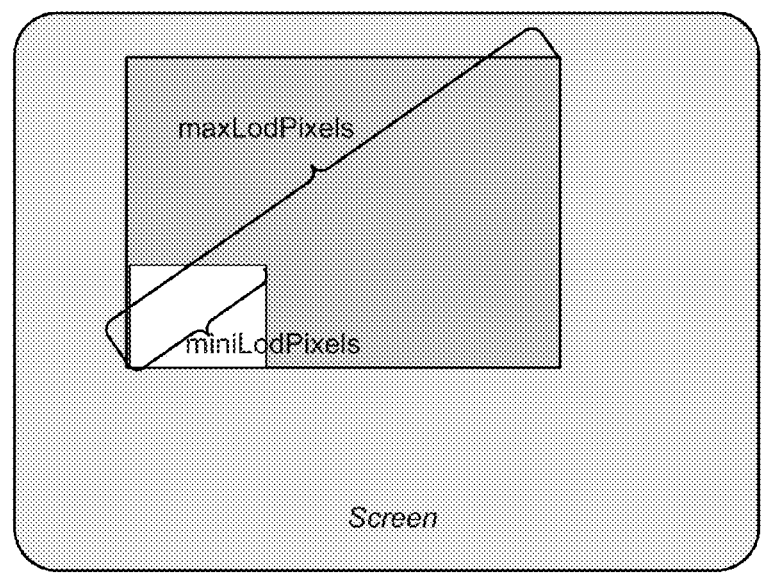
FIG. 4b illustrates minLodPixels and maxLodPixels values with respect to the display area.

The LOD tag would be embedded with a Region tag, for example. The LOD (level of detail) specification includes conditional-data defining a minimum projected pixel size at which the associated region and data object should be not activated for processing even when the bounding volume specified by the region is visible based on the virtual camera viewpoint. This feature is useful for suppressing the processing of the data object—for example its display—when it would appear too small to the viewer, even if it were visible. This is desirable to reduce both computational demands on the system, as well as reducing the visual clutter that could arise when large number of data objects are displayed, but cannot be usefully read by the viewer. Preferably, the LOD specification also includes conditional-data defining a maximum projected pixel size at which the associated region and data object should be not activated even when the bounding volume specified by the region is visible based on the virtual camera viewpoint. This feature is useful because the data object may be too detailed to visibly render where the display areas based on the virtual camera viewpoint is very large. Conversely, the data object may be have insufficient resolution in a small display area causing the data object once rendered to be distorted or "grainy. These two values, "minLodPixels" and "maxLodPixels" serve to limit the activation of the data object to the projected pixel size range defined by these two conditional-data values and the visibility of the bounding volume specified by the region based on the virtual camera viewpoint. FIG. 4(b) illustrates these two values with respect to the display area.

The use of multiple data objects each with adjoining or overlapping LOD range specifications, allows a set of alternate versions of a data object, each with different levels of detail or resolution, to be associated with a same bounding volume specified in the regions. Each of the data objects is activated individually based on associated LOD range specifications and projected pixel size of the visual environment.

Figure 5:
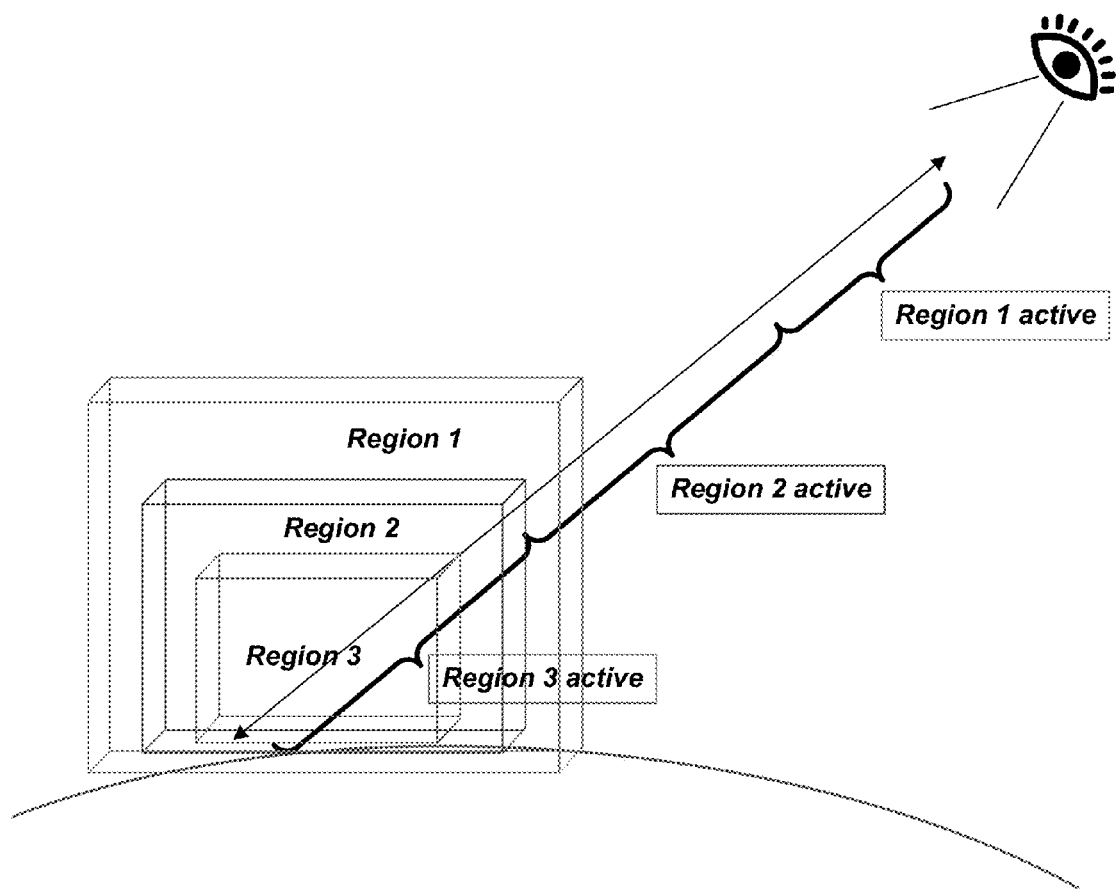
FIG. 5 provides a conceptual illustration of the use of level of detail (LOD) specifications in regions.

FIG. 5 provides a conceptual illustration of the use of level of detail (LOD) specifications in regions. Level of detail (LOD) specifications are associated with data objects with different levels of resolution to control the activation of data objects based on the projected pixel size of the visual environment. The nested regions 1, 2 and 3 in the illustration are used to specify LOD specifications associated with data objects of increasingly finer levels of detail. In the figure, each region corresponds to a range of LOD values that specify increasingly smaller projected pixel sizes associated with progressively larger boxes. As the user's viewpoint (e.g. virtual camera viewpoint) moves closer, the pixel size of the display area increases, causing regions with level of detail (LOD) specifying ranges of large values denoting higher resolution data objects to become active because the data objects takes up more screen space. The regions with finer level of detail replace the previously loaded regions with coarser resolution and are rendered in the visual environment relative to the virtual camera viewpoint. Accordingly, regions can also be used to separate data into "layers," so that different sets of data are displayed as the user explores a given area from different virtual camera viewpoints.

When the geographic information system processes the region specification to evaluate whether the bounding box is visible based on the virtual camera viewpoint and then further determines whether the projected pixel size is within the LOD range specified, the result is either that the data object is active and processed or inactive and not processed. When processing a data objects entails rendering the data object, it may be preferable to have a gradual transition between these states for reasons such as visual quality and style. An additional specification in associated with the minimum and maximum projected pixel sizes in the specification defines conditional-data for visual fading of the associated data object when it is activated and rendered.

This conditional-data for a gradual transition, such as visual fading, is defined by a minimum fade extent and a maximum fade extent both of which are measured in the same units of projected pixel size. A specific example of a LOD specification with defined values in a "minFadeExtent" tag and a "maxFadeExtent" tag is included below:

```
<Lod>
    <minLodPixels>A</minLodPixels>
    <maxLodPixels>B</maxLodPixels>
    <minFadeExtent>C</minFadeExtent>
    <maxFadeExtent>D</maxFadeExtent>
</Lod>
```

FIG. 6 illustrates the visibility of activated regions and associated data object based on the LOD definition and Fade- Extents using the above example. The activity of the associated data object based on the projected pixel size (PPS) for the associated region and the A, B, C, and D values are also summarized below:

a. At PPS values less than A, the data is not active.
b. At PPS value A, the data becomes active with 100% transparency.
c. At PPS values between A and A+C, the data remains active with transparency interpolating between 100% and 0% as the PPS value ranges from A to A+C.
d. At PPS value A+C, the data remains active with 0% transparency.
e. At PPS values between A+C and B-D, the data remains active with 0% transparency.
f. At PPS value B-D, the data remains active with 0% transparency.
g. At PPS values between B-D and B, the data remains active with transparency interpolating between 0% and 100% as the PPS value ranges from B-D to B.
h. At PPS value B, the data remains active with 100% transparency.
i. At PPS values greater than B, the data is not active.

The interpolation processes in the above example may be linear (for example, with direct proportionality of transparency from 100% to 0% as the PPS ranges between A and A+C), or may be computed as any of a variety of curved interpolants (such as sinusoidal "eased curves").

The interpretation of LOD specifications may be modified by the GIS client application in order to attain a steadier processing rate or to attain a specified processing rate, such as number of frames (output images) rendered per second as is useful in an interactive computer graphics application. When the application is approaching an upper limit of processing time per frame, it would desire to reduce processing burden; when it is approaching a lower limit on processing time, it may desire to increase processing burden so as to increase data quality using idle resources. To dynamically decrease or increase the processing burden as appropriate to maintain a desired frame rate, the GIS client application may pursue three independent and parallel options: first, to scale the min and max PPS values to cause data to be activated for a lesser or greater range of PPS sizes; secondly, to scale the min and max fade parameters to cause the potentially computationally expensive transparency processing to happen over a smaller or larger range of PPS values; and thirdly, to perform these scaling adjustments differently for different classes of objects based on an importance or class criterion defined in the data.

Since data object loading can require processing time, the GIS client or server application may anticipate the future activation objects of data by pre-activating data objects by loading but not displaying data objects that is almost within a region's extent or almost within the PPS bounds. In this way, the latency required to fetch and prepare data for processing may happen prior to the first.

The associated graphic data objects controlled by LatLonAltBox and LOD specifications may be directly specified data, such as points, lines, polygons, spline curves, text, sounds, icons, video, or images or they may be indirectly specified by references to such data stored in external files, remote data services, or other indirect data sources such as data logging equipment.

Given that the data objects associated with a region can have a variety of types, the particular processing of the data objects upon activation is specific to the type of the data object. Graphic data objects are rendered in the visual environment relative to the virtual camera viewpoint upon activation. Sound data elements will be played upon activation. Video data objects will also be displayed in the geographic information system relative to the virtual camera viewpoint. Elements for controlling the video data objects are also provided to the user. For instance, the user is provided with a slider to control the timed display of the video data object.

Additional conditional-data can be included in the region specification to control the priority of display of graphic data objects. The inclusion of a priority value in the region specification allows for the control of the selective display of graphic data objects in instances where the system cannot render a large number of the data objects because of the area of the display. For instance, in instances where Placemarks for only small number of cities can be displayed based on a virtual camera viewpoint at an altitude high above the Earth's surface, priority value are defined the region specification to specify Placemarks with a higher priority for display such as capital cities.

Regions are one type of conditional-data for data-driven guarded execution of associated data objects. Other types of conditional-data are possible as well. Conditional-data based on time (only active associated data objects if a specified time element or time range element is within a specified time range) and classification are also useful to manage complexity in large data sets. For example, a classification based condition can specify activating data objects with a class characteristic of X, where the value, X, is matched using either categorical (e.g., X="restaurants") or quantitative values, such as X being within a range of values, as in $3<=X<=10$. The examples given here are illustrative but not all-inclusive. Preferably, a 3-axis box (using latitude, longitude, and altitude as the axes) is used for the bounding value, however alternatives include 2-axis boxes, spheres, polyhedrons. The projected pixel size can be computed in a variety of ways, preferably by projecting the region boundary through the camera's world-to-screen transformation, but alternatively by the use of bounding spheres, bounding planes, slabs, and other such known size estimation techniques. The fade process for active data implemented by the LOD parameters may be made more efficient by not activating data with 100% transparency, may be made more visually pleasing by using non-linear interpolation curves, and may be one-sided or avoided by setting the C and D parameters to values indicating zero and infinity, respectively.

Region-Based Network Links

Because the processing of the bounding volume specified by the region and the optional LOD specification will prevent the associated data object from being activated unless the bounding volume specified in the region is visible in the display area based on virtual camera position and the bounding volume projected pixel size is within a defined range, external data objects contained in references associated with the parent data object will not be accessed, loaded, processed, or displayed until the region is activated. This fact allows the construction of data objects with regions, references, and region LatLonAltBox and Lod parameters that cause a GIS client of server application implementing this technique to efficiently load only the necessary and useful subset of an arbitrarily large data file with the choices of which data objects to activate and process being driven by the region specifications in the data objects. This is a significant benefit compared to the first N, last N, and statistical sampling approaches of conventional GIS designs.

In one embodiment, region-based network links are used to reference child data objects. Region-based network links use "smart" loading of child data objects through the use of reference links associated with a parent data object. A network link may be combined with a region for data-driven guarded loading of data objects. If the region associated with a network link becomes active, the system can fetch and evaluate the data file specified in the networklink. In the following example a network link is defined which contains a region and a link to a child data file "romaniaRegion.kml":

```
<NetworkLink>
    <name>romania NetworkLink</name>
        <Region>
            <LatLonAltBox>
                <north>50.625</north>
                <south>45</south>
                <east>28.125</east>
                <west>22.5</west>
            </LatLonAltBox>
            <Lod>
                <minLodPixels>128</minLodPixels>
                <maxLodPixels>1024</maxLodPixels>
            </Lod>
        </Region>
        <Link>
            <href>romaniaRegion.kml</href>
            <viewRefreshMode>onRegion</viewRefreshMode>
        </Link>
</NetworkLink>
```

When the above specified region is evaluated to be active, the child data file specified using the <Link> data tags is loaded in the geographic information system client or server application, and processed, including evaluation of any regions specified therein; this linking that provides for hierarchical layering and control of regions and the execution of their data objects. The region defined by the child data file is evaluated to determine if the region is active by generating a projection of the bounding volume specified by the region. Using the above example, the file romaniaRegion.kml is included below. The example KML file below includes a region, a LOD specification, and the definition of a Placemark as a data object. In the below example, the Placemark is defined as a LineString:

```
<?xml version="1.0" encoding="UTF-8"?>
<kml xmlns="http://earth.google.com/kml/2.1">
<Document>
    <name>romania Document</name>
        <Region>
            <LatLonAltBox>
                <north>50.625</north>
                <south>45</south>
                <east>28.125</east>
                <west>22.5</west>
            </LatLonAltBox>
            <Lod>
                <minLodPixels>128</minLodPixels>
                <maxLodPixels>1024</maxLodPixels>
            </Lod>
        </Region>
        <Placemark>
            <name>romaniaRegion</name>
            <LineString>
                <tessellate>1</tessellate>
                <coordinates>
                    22.5,45,0
                    28.125,45,0
                    28.125,50.625,0
                    22.5,50.625,0
                    22.5,45,0
                </coordinates>
            </LineString>
        </Placemark>
</Document>
</kml>
```

Super Overlays

Figure 7:
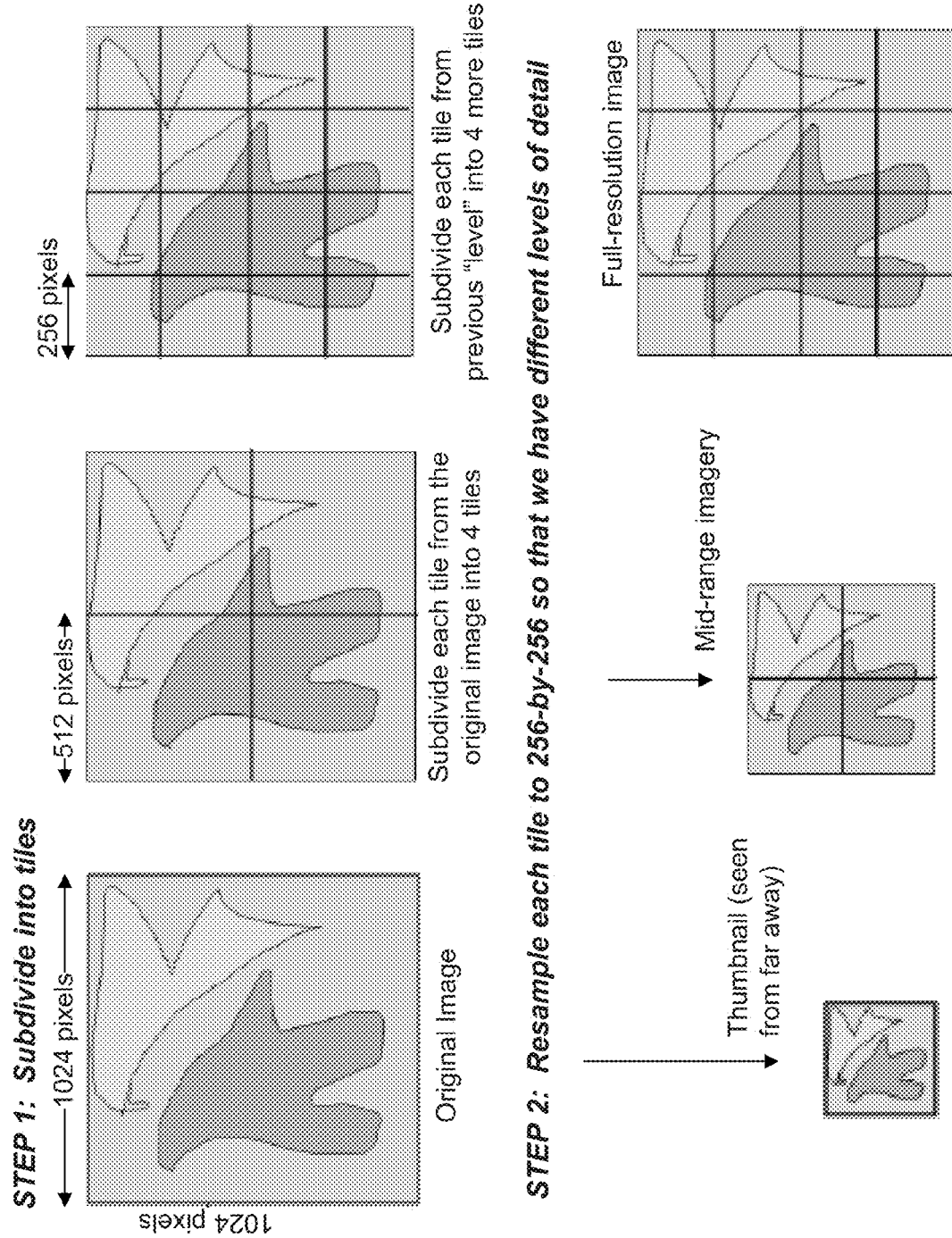
FIG. 7 illustrates the use of network links to create a hierarchy of image data objects of increasingly finer resolution in accordance with one embodiment.

Region-based network links can be used in combination with a hierarchy of images with increasing levels of detail. FIG. 7 illustrates a use of regions to create a three-level hierarchy of data object tiles for faster loading of data. In Step 1, images of different levels of resolution are subdivided into a series of sub-images or "tile" data objects. In this example, three different copies of an image with a high level of detail (1024 pixels) are divided into a different number of tiles (1, 4 and 16) representing different levels of detail. In Step 2, the resolution of each set of tiles is re-sampled such that each tile has the same number of pixels. The sets of tiles derived from the three different images are used to define regions at different levels of specificity using LOD definitions as described in reference to FIG. 5.

In FIG. 7 each set of images can contain a set network links to child data objects of finer resolution. Using this example, the single thumbnail image can contain network links to each of the four mid-range images prompting the files for the mid-range images to be retrieved when the thumbnail becomes active. The mid-range images can then be evaluated and activated based on their LOD specifications. Likewise, each mid-range image can contain network links to four files of the full-resolution images.

These hierarchies of region-based network links can be specified using GroundOverlays as data objects or "tiles" in order to create Super-Overlays. In Super-Overlays, a hierarchy of region-based Network Links created in association with GroundOverlays. The drawOrder specification included as part of the GroundOverlay specification is used to control overlay rendering. Overlays with a higher draw order values are rendered on top of or "stacked" on overlays with lower draw order values. The use of the drawOrder mechanism for "stacking" the overlays allows for seamless transition between child and parent GroundOverlays rendered by the system.

Below is an example of a region specification in association with a GroundOverlay. In the below example, network links are used to reference four child kml files which specify four child GroundOverlays to create a Super-Overlay. These network links are associated with four subsections of the parent region described in the LatLonAltBox associated with each network link. Upon activation of their respective subsections of the parent region, the network link kml files specifying the child GroundOverlays are loaded and evaluated by the geographic information system. Upon activation the child GroundOverlays specified within the child kml files are rendered on top the parent GroundOverlay according to the drawOrders specified in the child kml files:

```
<Region>
    <LatLonAltBox>
        <north>37.439803</north>
        <south>37.372709</south>
        <east>-122.059342</east>
        <west>-122.129313</west>
        <minAltitude>0</minAltitude>
        <maxAltitude>0</maxAltitude>
    </LatLonAltBox>
    <Lod>
        <minLodPixels>0</minLodPixels>
        <maxLodPixels>-1</maxLodPixels>
        <minFadeExtent>0</minFadeExtent>
        <maxFadeExtent>0</maxFadeExtent>
    </Lod>
</Region>
<NetworkLink>
    <name>01</name>
```

-continued

```
        <open>1</open>
        <Region>
            <LatLonAltBox>
                <north>37.439803</north>
                <south>37.406256</south>
                <east>-122.059342</east>
                <west>-122.094328</west>
                <minAltitude>0</minAltitude>
                <maxAltitude>0</maxAltitude>
            </LatLonAltBox>
            <Lod>
                <minLodPixels>384</minLodPixels>
                <maxLodPixels>-1</maxLodPixels>
                <minFadeExtent>0</minFadeExtent>
                <maxFadeExtent>0</maxFadeExtent>
            </Lod>
        </Region>
        <Link>
            <href>01.kml</href>
            <viewRefreshMode>onRegion</viewRefreshMode>
        </Link>
    </NetworkLink>
    <NetworkLink>
        <name>00</name>
        <open>1</open>
        <Region>
            <LatLonAltBox>
                <north>37.439803</north>
                <south>37.406256</south>
                <east>-122.094328</east>
                <west>-122.129313</west>
                <minAltitude>0</minAltitude>
                <maxAltitude>0</maxAltitude>
            </LatLonAltBox>
            <Lod>
                <minLodPixels>384</minLodPixels>
                <maxLodPixels>-1</maxLodPixels>
                <minFadeExtent>0</minFadeExtent>
                <maxFadeExtent>0</maxFadeExtent>
            </Lod>
        </Region>
        <Link>
            <href>00.kml</href>
            <viewRefreshMode>onRegion</viewRefreshMode>
        </Link>
    </NetworkLink>
    <NetworkLink>
        <name>03</name>
        <Region>
            <LatLonAltBox>
                <north>37.406256</north>
                <south>37.372709</south>
                <east>-122.059342</east>
                <west>-122.094328</west>
                <minAltitude>0</minAltitude>
                <maxAltitude>0</maxAltitude>
            </LatLonAltBox>
            <Lod>
                <minLodPixels>384</minLodPixels>
                <maxLodPixels>-1</maxLodPixels>
                <minFadeExtent>0</minFadeExtent>
                <maxFadeExtent>0</maxFadeExtent>
            </Lod>
        </Region>
        <Link>
            <href>03.kml</href>
            <viewRefreshMode>onRegion</viewRefreshMode>
        </Link>
    </NetworkLink>
    <NetworkLink>
        <name>02</name>
        <Region>
            <LatLonAltBox>
                <north>37.406256</north>
                <south>37.372709</south>
                <east>-122.094328</east>
                <west>-122.129313</west>
                <minAltitude>0</minAltitude>
                <maxAltitude>0</maxAltitude>
            </LatLonAltBox>
            </LatLonAltBox>
            <Lod>
                <minLodPixels>384</minLodPixels>
                <maxLodPixels>-1</maxLodPixels>
                <minFadeExtent>0</minFadeExtent>
                <maxFadeExtent>0</maxFadeExtent>
            </Lod>
        </Region>
        <Link>
            <href>02.kml</href>
            <viewRefreshMode>onRegion</viewRefreshMode>
        </Link>
    </NetworkLink>
    <GroundOverlay>
        <drawOrder>21</drawOrder>
        <Icon>
            <href>http://dev.keyhole.com/bent/kml21-tests/mv-doqq/images/mv-doqq0.PNG</href>
        </Icon>
        <LatLonBox>
            <north>37.439803</north>
            <south>37.372709</south>
            <east>-122.059342</east>
            <west>-122.129313</west>
        </LatLonBox>
    </GroundOverlay>
```

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A non-transitory computer-readable storage medium encoded with a computer-readable data structure for describing an object and a three dimensional volume defining an activation condition of the object, the data structure readable by a computer processor to display the object, the data structure comprising:

at least one object markup language element, the object markup language element defining an object to be activated;

a plurality of object tags associated with the object markup language element wherein the plurality of object tags describe the object defined by the object element;

a plurality of coordinate markup language elements, each coordinate markup language element defining a three dimensional coordinate in a three dimensional space; and a plurality of region tags, comprising a tag for each coordinate markup language element, wherein the region tags describe a three dimensional volume defining the activation condition of the object.

2. The computer-readable storage medium of claim 1, the data structure further comprising:

a minimum pixel markup language element defining a minimum number of pixels;

a maximum pixel markup language element defining a maximum number of pixels; and a plurality of tags, comprising tags for the maximum and minimum pixel markup language elements, wherein the tags describe a visibility range under which the object is to be displayed.

3. The computer-readable storage medium of claim 1, further comprising:

a plurality of fade display markup language elements, each element defining a number of pixels over which to render the object with a level of transparency; and a plurality of tags, comprising a tag for each element, wherein the tags represent interactive display values for the data object.

4. The computer-readable storage medium of claim 1 further comprising:

a location markup language element specifying a network location of the object; and a plurality of location tags associated with the location markup language element.

5. The computer-readable storage medium of claim 4, further comprising:

a refresh markup language element defining a condition upon on which to retrieve the object from the network location; and a plurality of refresh tags associated with the refresh markup language element.

* * * * *